United States Patent Office 3,162,641
Patented Dec. 22, 1964

3,162,641
CHARGE-TRANSFER COMPOUNDS OF 7,7,8,8-TETRACYANO-p-QUINODIMETHAN AND C-HYDROCARBYL SUBSTITUTED 7,7,8,8-TETRACYANO-p-QUINODIMETHANS WITH LEWIS BASES
Donald S. Acker, Waynesboro, Va., and Dale C. Blomstrom, Wilmington, Del., assignors to E. I. du Pont de Nemours and Company, Wilmington, Del., a corporation of Delaware
No Drawing. Filed July 23, 1962, Ser. No. 211,896
15 Claims. (Cl. 260—236)

This invention relates to a new class of chemical compounds and to their preparation, and more particularly to the charge-transfer compounds of 7,7,8,8-tetracyanoquino-dimethan and C-alkyl - 7,7,8,8 - tetracyano-quinodimethans with Lewis bases and to crystals, including single crystals, of said charge-transfer compounds and methods for the preparation of such compounds.

This application is a continuation-in-part of our co-pending applications Serial No. 762,282, filed September 22, 1958, now abandoned; Serial No. 826,135, filed July 10, 1959, now abandoned; Serial No. 17,753, filed March 28, 1960, now Patent No. 3,115,506; and Serial No. 75,009, filed December 12, 1960, now Patent No. 3,062,019.

The present invention is generic to charge-transfer compounds of 7,7,8,8-tetracyanosubstituted-quinodimethan (referred to hereafter for brevity as TCNQ) and -alkyl-quinodimethans with Lewis bases broadly, including specifically organic and organo-inorganic Lewis bases. Charge-transfer compounds of previously known Lewis acids with Lewis bases are well known in the art. Frequently these charge-transfer compounds were referred to as pi complexes. More recently, the concept has become well established that such complexes are more properly described as charge-transfer compounds—see, for instance, Mulliken, J. Am. Chem. Soc. 74, 811 (1952). The charge-transfer compounds of TCNQ and alkyl TCNQ's with Lewis bases range in degree of charge transfer from those of true complex structure to those where actual and complete charge transfer exists in the ground electronic state. Compounds of the last-mentioned type constitute so-called anion-radical salts wherein at least one molecule of TCNQ carries at least one transferred electron, and accordingly a negative electronic charge, and at least one molecule of the Lewis base component will have donated at least one electron to the TCNQ component and will accordingly have an electron deficiency, and, therefore, a positive electronic charge. The invention is generic to those charge-transfer compounds of TCNQ with Lewis bases which exhibit a detectable paramagnetic resonance absorption under normal conditions. It is likewise generic to TCNQ charge-transfer compounds wherein the maximum charge-transfer occurs not in the ground electronic state but rather in the excited state (see Orgel, Quart. Rev. Chem. 8, 1422 (1954) for a discussion of this type of normally diamagnetic charge-transfer compounds).

The charge-transfer compounds of TCNQ and the alkyl-substituted TCNQ's with Lewis bases can broadly be formulated as $$(M^{+n})_x(TCNQ)_y^{-nx}$$

wherein TCNQ, as is so throughout this specification, represents generically both TCNQ itself and the various C-alkyl-substituted TCNQ's; $n$ is the formal positive charge on the cation M; $x$ is the number of said cation species present, which in the plural instance includes mixed individual cations; $-nx$ is the total negative charge on the TCNQ moieties, i.e., the charge-transfer compound is overall electronically neutral; and $y$ is the total number of TCNQ species present, inclusive of both the anion-radical and combined neutral types. Thus, broadly speaking, these charge-transfer compounds can be described in two general types of the formulas $$(M^{+n})_x(TCNQ)_y^{-nx}$$

wherein there are no combined neutral species, and

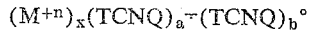

where $a+b=y$ and there are combined neutral species as indicated by the (°), where (−) indicates a negative ionic charge and (·) an electron, and $x$ and $y$ are numbers, alike or different, both whole and fractional and generally from 1 to 6.

The charge-transfer compounds include those with the simple monovalent anion radicals (TCNQ)⁻ in which one electron has been transferred per TCNQ species. These can be illustrated by the structure

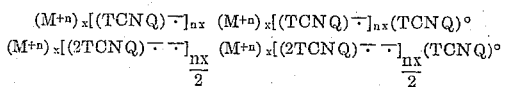

and the like.

The invention also obviously includes the charge-transfer compounds where more than one electron has been transferred in one or more TCNQ moiety, e.g., of the type

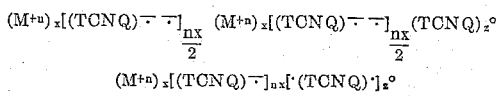

where $z$ is a number from 1 to 6, and the like.

These all represent electronic resonance hybrid structures. In the latter group different electronic configurations in the sense of the number of electrons involved per moiety differ but the overall charge of the complexes in all cases remains neutral. As is conventionally accepted, we do not intend to represent structurally all the resonance hybrids contributing to the stable ground state of any one of these charge-transfer compounds. For convenience and brevity throughout this specification, the single anion-radical representation will be used, i.e., in the format (TCNQ)⁻, and we intend to include thereby all possibly contributing electronic resonance hybrid forms.

Also we intend to include in these charge-transfer compounds, including compounds containing more than one cation per molecule, defect-type structures quite parallel to the well-known oxygen-deficient metal oxides, as well as metal-deficient metal oxides. Thus, these charge-transfer compounds include species which can be deficient in either or both the cation or anion portion. Furthermore, in the case of those compounds of the more complex charge-transfer compound structure wherein there is present in the ground state of the compound combined neutral TCNQ moeties, these combined neutral moieties do not necessarily have to be integral. These combined neutral moieties can be present in both an integrally and/or non-integrally equivalent number to the anion-radical species, as well as an itegrally or non-integrally greater or lesser equivalent than the anion-radical moieties. All such permutations in the stoichiometry and structure of these charge-transfer compounds will be discussed in greater detail with specific illustrations in the specification following the fully detailed exemplary disclosures.

Lewis bases which, with TCNQ, form the necessary second component for forming the charge-transfer compounds of TCNQ are well known to the chemical art (see G. N. Lewis, J. Franklin Institute 226, 293 (1938) and following papers by Lewis and several coauthors). Broadly speaking, the Lewis base is, by definition, simply a molecule, the structure or configuration of which electronically speaking, is so arranged that the molecule is capable of donating one or more electrons to a molecule which has an electron-deficient structure. Many and varied electron donor compounds are known. To list but a few well-recognized such classes there need only be named:

The amines and various alkyl and aryl hydrocarbon-substituted amines which may be described structurally by the following two formulas:

where $R_1$, $R_2$, $R_3$ are H, alkyl, or alkylene up to 20 carbons and when $R_1$ is aryl, $R_2$ and $R_3$ are H or alkyl up to 20 carbons, and the corresponding quaternary ammonium salts as below,

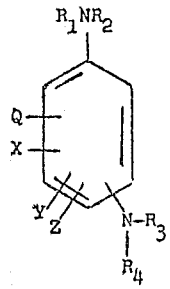

where the amino substituents are ortho or para to each other and $R_1$, $R_2$, $R_3$, $R_4$ are alkyl up to 20 carbons and Q, X, Y, Z are H or hydrocarbon up to 20 carbons, which can be together joined, or other ortho- or para-directing substituents with the provisos that (1) when $R_1$, $R_2$, $R_3$, and $R_4$ are alkyl, Q and X are H, (2) when $R_1$ and $R_3$ are aryl, $R_2$ and $R_4$ are H or alkyl, and (3) where Q—X and/or Y—Z taken pairwise are cycloalkylene or fused aromatic, $R_1$ and $R_3$ are H, and the corresponding quaternary ammonium salts wherein the quaternary radical is another $R_1$, $R_2$, $R_3$, $R_4$ and any of the usual anions is involved;

The phosphines and alkyl or aryl hydrocarbon-substituted phosphines:

where $R_1$, $R_2$, and $R_3$ are alkyl or aryl up to 20 carbons (the aryls being unsubstituted or having o- and p-directing substituents),

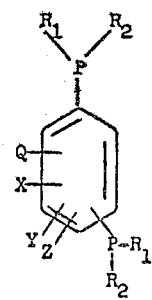

where $R_1$, $R_2$, Q, X, Y, and Z are as above in the aryl amine analogs except that $R_1$ and $R_2$ cannot be H, and the corresponding quaternary phosphonium salts wherein the quaternary radical is another $R_1$, $R_2$, $R_3$ and any of the usual anions is involved;

The arsines and alkyl and aryl hydrocarbon-substituted arsines:

where $R_1$, $R_2$, and $R_3$ are as above in the phosphine analogs,

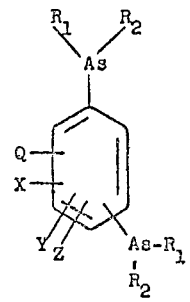

where $R_1$, $R_2$, Q, X, Y, and Z are as above in the aryl phosphine analogs, and the corresponding quaternary arsonium salts wherein the quaternary radical is another $R_1$, $R_2$, $R_3$ and any of the usual anions in involved;

The stibines and alkyl and aryl hydrocarbon-substituted stibines:

where $R_1$, $R_2$, and $R_3$ are as above in the arsine analogs,

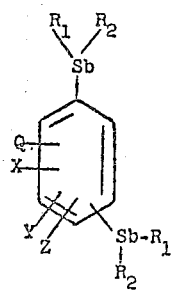

where $R_1$, $R_2$, Q, X, Y, and Z are as above in the aryl arsine analogs, and the corresponding quaternary stibonium salts wherein the quaternary radical is another $R_1$, $R_2$, $R_3$ and any of the usual anions is involved;

The quaternary ammonium bases or their salts, such as $R_1R_2R_3R_4N^{\oplus}$ where $R_1$, $R_2$, $R_3$, and $R_4$ are H or alkyl up to 20 carbons; metal cations describable by $M^{+x}$ where M is a metal and $x$ is the formal cationic valence of the metal; metal chelates having all planar configurations, the atoms which coordinate with the metal being joined by a conjugated system of double bonds (aromatic or open chain); aromatic or heterocyclic aromatic amino-phenols or ethers, the O and N atoms being connected by a conjugated system of double bonds; aromatic hydrocarbon or alkyl-substituted aromatic hydrocarbons including polynuclear ones; and polyhydric phenols and ethers thereof.

Also included are the substituted amines of the alkyl and aryl hydrocarbon-substituted types defined by the foregoing two structural formulas wherein $R_1$, $R_2$, $R_3$, and/or $R_4$ are variously oxaalkylene or thiaalkylene or oxaalkyl, or thiaalkyl, e.g., 4-thiapiperidine, as well as the hydroiodides of the foregoing primary, secondary, or tertiary amines, and also the corresponding quaternary ammonium iodides, e.g., morpholine hydroiodide;

All heterocycles containing nuclear nitrogen and the hydroiodides or alkyl iodide salts thereof;
Substituted ethylenes of the type

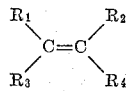

wherein from one to four of the $R_1$, $R_2$, $R_3$, or $R_4$ groups are amino or alkylamino, any remaining being alkyl, alkoxy, alkylthio, aryl, aryloxy, or arylthio; and the hydroiodide or alkyl iodide salts thereof, including the plain podides, e.g., of the aminium type $R_3N+I^-$;

And the Wurster iodides of aromatic amines, e.g., Würster's blue iodide,

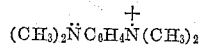

(In the foregoing diamines, it is expressly intended to include polynuclear diamines in which the nitrogens are connected by a conjugated system.)

In all the foregoing instances, the molecular structure in the hydrocarbon moieties can also carry functional substituents. The preferred substituents can be classed as those which, when present on ring carbon of an aromatic nucleus, tend to direct any entering substituent into the ortho- or para-position, i.e., the so-called ortho-para orienting groups. The substituents have also been described by Price, Chem. Rev. 29, 58 (1941), in terms of the electrostatic polarizing force as measured in dynes of the said substituent groups on an adjacent double bond of the benzene nucleus. Quantitatively, any substituent which has or exhibits an electrostatic polarizing force in dynes less than 0.50 can be regarded as ortho-para orienting and electropositive, and is preferred here. These preferred substituents include: alkyl hydrocarbon up to 10 carbons; substituted alkyl up to 10 carbons, e.g., aminoalkyl, hydroxyalkyl, alkoxyalkyl, vinylalkyl, haloalkyl; hydroxy; alkoxy up to 10 carbons; thiol, alkyl thiol (up to 10 carbons); amino; N-alkylamino or N,N-dialkylamino with alkyls up to 10 carbons; N-monoarylamino; and the like.

Suitable specific Lewis bases for making the TCNQ/ and alkyl-substituted TCNQ/Lewis base charge-transfer compounds in molar ratios from 2/1 to 1/2 are given in the following list. In connection with the molar ratios just given, it is to be understood that the present charge-transfer compounds lie within the arithmetical range of the two molar ratio extremes and not solely at the extremes. Thus, charge-transfer compounds of the present invention are inclusive of, for instance, 4/2, 3/2, 1.5/1, and the like TCNQ/ and alkyl-substituted TCNQ/Lewis base charge-transfer compounds. Useful specific Lewis bases include: ammonia, and amines, such as ethylamine, methylamine, dibutylamine, tridecylamine, and the like; diamines, such as 2,3 - N,N,N',N' - hexamethyl - p-phenylene-diamine, N,N' - dioctyl - 1,5 - diaminonaphthalene, and the like; phosphines and diphosphines, such as triphenylphosphine, tributylphosphine, ethyldioctylphosphine, 1,4 - bis(diethylphosphino) - benzene, and the like; ammonium and quaternary ammonium bases and salts, such as ammonium iodide, ethyltrimethylammonium iodide, dioctylammonium iodide, methyltri - n - propylammonium iodide, tetramethylammonium hydroxide, and the like; metals, such as Na, K, Li, Ag, Cu, and the like; metal precursors, such as the carbonyls, iodides, cyanides, e.g., iron and cobalt carbonyls, iodides, cyanides, and the like; metal chelates, such as copper salicylaldimine, cobalt pyrrolealdehydeimine, nickel 4-methoxysalicylaldoxime, copper 5-methoxy-8-quinolinoate, and the like; heterocyclic aromatic amines, phenols, and ethers, such as 4-aminopyridine, 3-hydroxyacridine, 3-dimethylamino-carbazole, 2-methoxyphenazine, and the like; aromatic hydrocarbon ethers, such as phenetidine, N,N-diethylanisidine, and the like; aromatic hydrocarbons and alkyl substituted aromatic hydrocarbons, including polynuclear, such as chrysene, coronene, hexamethylbenzene, 2-ethylphenanthrene, and the like.

The 7,7,8,8-tetracyanosubstituted-quinodimethan and -alkylquinodimethans which with Lewis bases form the charge-transfer compounds of the present invention are themselves new compounds which are being claimed as such in our aforesaid referred to copending application Serial No. 17,753. These compounds, which can also be described as 1,4-bisdicyanomethylene-cyclohexadiene and -alkylcyclohexadienes, are prepared in accord with the following stoichiometry:

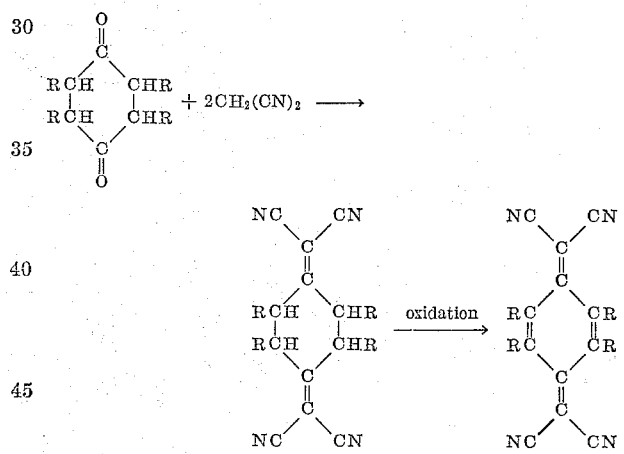

wherein R is hydrogen or alkyl of one to eight carbons.

In the step of condensing the 1,4-cyclohexanediones with malononitrile, the presence of a catalyst is necessary. The catalyst can be an acid or a base, or a salt which ionizes in water to give an acidic or basic solution. Thus there can be employed any of the wide variety of catalysts that have been shown useful in the Knoevenagel and aldol condensations. Active catalysts include hydrochloric acid, sodium and potassium carbonates, sodium and potassium cyanides, sodium acetate, ammonium acetate, piperidinium acetate, sodium bisulfite, sodium hydroxide, trisodium phosphate, diethylamine, zinc chloride, sodium methoxide, acidic or basic ion exchange resins, pyridine, piperidine, and the like.

In the condensation step, water is always formed, and yields are sometimes improved if it is removed. This can be done by means of dehydrating agents, by simple distillation, or by refluxing the reaction mixture in the presence of an inert organic liquid immiscible with water, such as a hydrocarbon, and separating the water from the reflux condensate.

The step of oxidizing the 1,4-bis(dicyanomethylene)-cyclohexanes to the corresponding cyclohexadienes can be carried out by direct oxidation, such as by the action of air, oxygen, a peroxide, or any direct chemical oxidant, or it can be carried out indirectly by halogenating and dehydrohalogenating as indicated in the following equation:

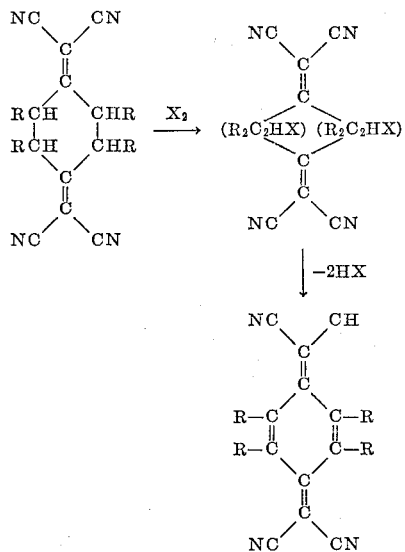

where X is chlorine or bromine. Alternatively the halogenation can be carried out by a halogenating agent such as, for instance, N-bromosuccinimide, phosphorus pentabromide, phosphorus pentachloride, and the like.

The following examples in which the parts given are by weight are submitted to more fully illustrate but not to limit the TCNQ/Lewis base charge-transfer compounds of the present invention:

EXAMPLE I

Part A.—1,4-Bis(Dicyanomethylene)Cyclohexane

A mixture of 140 parts of malononitrile, 112 parts of 1,4-cyclohexanedione, 63 parts of acetic acid, and 20 parts of ammonium acetate in 1760 parts of benzene was heated under reflux using a water separator for about two hours or until the theoretical amount of water had been removed. The reaction mixture was cooled and the solid product which precipitated was collected by filtration and washed well with water. Recrystallization from ethyl acetate gave 159 parts (76.5% yield) of 1,4-bis(dicyanomethylene)cyclohexane, M.P. 197–212° C. A sample for analysis was prepared by several recrystallizations from ethyl acetate, M.P. 204–210° C.

*Analysis.*—Calcd. for $C_{12}H_8N_4$: C, 69.2; H, 3.9; N, 26.9. Found: C, 69.4; H, 4.1; N, 26.3.

Another and preferred technique in view of the noticeably higher yields and greater purity of the product therein obtained is illustrated in the following:

In an open glass reactor of internal capacity corresponding to 1,000 parts of water was placed 1000 parts of 1,4-cyclohexanedione and 119 parts of malononitrile. The mixture was heated at steam bath temperatures until significant melting had occurred, at which point a solution of one part of β-alanine in 200 parts of water was added. The reaction vessel was heated at steam bath temperatures with occasional swirling until the formation of a few crystals was noted, at which point heating was discontinued. An exothermic reaction then began, and, when it had become sufficiently vigorous to cause the reaction mixture to boil, the reactor was placed in an ice/water bath until boiling had ceased, at which point the reactor and the still warm reaction mixture were removed from the cooling bath and allowed to stand until it had cooled essentially to room temperature. The nearly solid mass was then filtered and washed with water until the washings were colorless. The filter cake was air-dried and then washed with diethyl ether until the washings were colorless. After air-drying, there was thus obtained 180 parts (97% of theory) of 1,4-bis(dicyanomethylene)cyclohexane as white crystals melting at 216–217° C.

Part B.—1,4-Bis(Dicyanomethylene)Cyclohexadiene, i.e., 7,7,8,8-Tetracyanoquinodimethan (TCNQ)

A solution of 76.5 parts of 1,4-bis(dicyanomethylene) cyclohexane in 1174 parts of acetonitrile was stirred at 50° C. under a nitrogen atmosphere while 160 parts of N-bromosuccinimide was added in small portions over a 45-minute period. The reaction mixture was stirred at the same temperature for an additional 45 minutes. It was then chilled to −20° C. and a solution of 72 parts of pyridine in 714 parts of ether added. After the reaction mixture was stirred at −15° to −20° C. for an additional 15 minutes, it was allowed to warm to room temperature. Cold water was added and the resultant precipitate was collected by filtration and recrystallized from ethyl acetate to give 641 parts (84% yield) of rust-colored crystals of 1,4-bis-dicyanomethylene)cyclohexadiene, M.P. 289–291° C. (dec.). After recrystallization from ethyl acetate, the product was sublimed under high vacuum at 200° C. with 97% recovery. It sublimed, apparently unchanged, when heated above 250° C. at atmospheric pressure. When a few crystals were crushed between micro cover glasses and heated on a Fisher melting point block, a deep blue film formed on the glass plates starting at about 200° C. A sample once crystallized from acetonitrile and then twice sublimed melted at 289–292° C.

*Analysis.*—Calcd. for $C_{12}H_4N_4$: C, 70.6%; H, 2.0%; N, 27.4%. Found: C, 71.0%; H, 1.9%; N, 27.4%.

Another technique for the halogenation/dehydrohalogenation procedure using a halogen directly as the halogenating reagent is illustrated in the following, which procedure generally results in a slightly purer product as evidence by the higher melting point.

A mixture of 12 parts of 1,4-bis(dicyanomethylene)-cyclohexane, 156 parts of acetonitrile, and 19.2 parts of bromine in a glass reactor was cooled with stirring using an external ice/water bath to 10° C. under an atmosphere of nitrogen. The reaction vessel was maintained in the ice/water bath, and a solution of 18.8 parts of pyridine in 23.5 parts of acetonitrile was added over a period of 15 minutes with continued stirring at such a rate that, with continued external cooling, the temperature of the reaction mixture remained at 0° C. The reaction mixture was then stirred an additional 30 minutes at 0° C., at which point the cooling bath was removed and the reaction mixture allowed to warm to 20° C. over a period of one hour, at which point solid removed by filtration. The filter cake was washed with water and air-dried, thereby affording 12.1 parts of crude TCNQ as a yellow solid melting at 293–295° C. with decomposition. After recrystallization from acetonitrile, there was obtained 9.3 parts (80% of theory) of pure TCNQ as rust-colored crystals melting at 293.5–296.0° C.

Part C.—Alternative Preparation of 1,4-Bis(Dicyanomethylene)-Cyclohexadiene or TCNQ A mixture of 284 parts of 1,4-bis(dicyanomethylene)-cyclohexane and 222 parts of selenium dioxide in 3,914 parts of acetonitrile was heated under reflux for six hours and filtered hot to remove any insoluble material. The solvent was then removed by evaporation under reduced pressure. The remaining solid residue was recrystallized from ethyl acetate and then sublimed to yield 45 parts of 1,4-bis(dicyanomethylene)cyclohexadiene. After recrystallization of this sublimed product from ethyl acetate, a product melting at 290–292° C. (dec.) was obtained.

As stated expressly in the foregoing, the present invention is generic to the charge-transfer compounds of 1,4 - bis(dicyanomethylene)-substituted 2,5 - cyclohexadienes and alkyl-2,5-cyclohexadienes. The immediately foregoing examples have illustrated in detail the preparation of the 1,4-bis(dicyanomethylene)-2,5-cyclohexadiene intermediate. Application of substantially the same techniques utilizing the corresponding C-alkylcyclohexane reactants results in the formation of the corresponding 1,4-bis(dicyanomethylene)alkylcyclohexadiene intermediates.

Part D.—2-Methyl-1,4-Bis(Dicyanomethylene) Cyclohexane

To 43 parts of 2-methyl-1,4-cyclohexanedione was added 46.2 parts of malononitrile and 0.5 part of β-alanine dissolved in five parts of water. The mixture was heated for two hours at steam bath temperatures and then let stand overnight at room temperature. The solid product was washed with water and then with diethyl ether and subsequently air-dried. There was thus obtained 54 parts (71% of theory) of crystalline 2-methyl-1,4-bis(dicyanomethylene)cyclohexane melting at 186–194° C. after recrystallization from ethyl acetate. The infrared spectrum of the product was wholly consistent with the 2-methyl-1,4-bis(dicyanomethylene)cyclohexane structure. The product exhibited a single absorption band in the ultraviolet region at 249 mμ with an extinction coefficient of 26,000.

Analysis.—Calcd. for $C_{13}H_{10}N_4$: C, 70.2%; H, 4.5%; N, 25.2%. Found: C, 70.1%; H, 4.8; N, 25.0%.

Part E.—2-Methyl-1,4-Bis(Dicyanomethylene)Cyclohexadiene, i.e., 2-Methyl-7,7,8,8-Tetracyanoquinodimethan (MeTCNQ)

To a solution of 20 parts of 2-methyl-1,4-bis(dicyanomethylene)cyclohexane and 28.8 parts of bromine in 290 parts of acetonitrile cooled with an external ice/salt bath was added 28.3 parts of pyridine slowly over a period of about twenty minutes with stirring while maintaining the external cooling. After the addition was complete, the reaction mixture was stirred for an additional one-half hour with cooling and then for two more hours at room temperature, at the end of which time 555 parts of cold water was added. The resultant solid product was removed by filtration and washed with 230 parts of cold water. The crude 2-methyl-7,7,8,8-tetracyanoquinodimethane (MeTCNQ) was dissolved in 706 parts of acetonitrile. After filtration, the filtrate was heated with decolorizing charcoal, filtered, and cooled to room temperature. The resultant clear filtrate was concentrated to a volume corresponding to 50 parts of water under a stream of nitrogen. On filtration and air-drying, there was thus obtained 3.6 parts (18% of theory) of pure MeTCNQ as dark tan microcrystals melting at 193–195° C. and exhibiting a single absorption maximum in the ultraviolet region at 396 mμ with an extinction coefficient of 45,600. The infrared spectrum was wholly consistent with the MeTCNQ structure.

Analysis.—Calcd. for $C_{13}H_6N_4$: C, 71.5%; H, 2.8%; N, 25.7%. Found: C, 71.3%; H, 3.4%; N, 25.8%.

Part F.—n-Propyl-1-4-Cyclohexanedione

A glass reactor equipped with suitable mechanical stirring means and a solid carbon dioxide/acetone-cooled reflux condenser was charged with about 500 parts of liquid ammonia and a solution of 29 parts of n-propyl-p-dimethoxybenzene in 48 parts of absolute ethanol and 56 parts of anhydrous diethyl ether. Over a period of 45–60 minutes, 23 parts of sodium was added in small portions while maintaining a gentle reflux. After a total reaction time of five hours, the reaction mixture lost the characteristic blue Na/NH₃ color and became white, at which point 70 parts of solid ammonium chloride was added. Cooling means were removed from the reflux condenser and the excess ammonia evaporated at room temperature under a stream of nitrogen. The remaining organic layer was washed with water, separated, and heated at steam bath temperatures with dilute aqueous hydrochloric acid for one hour. The remaining organic layer was separated, and upon distillation thereof there was obtained nine parts (37% of theory) of n-propyl-1,4-cyclohexanedione as a clear, colorless liquid boiling at 75–77° C. under a pressure corresponding to 0.30–0.33 mm. of mercury.

Analysis.—Calcd. for $C_9H_{14}O_2$: C, 70.1%; H, 9.1%. Found: C, 69.8%; H, 9.0%.

Part G.—n-Propylbis(1,4-Dicyanomethylene) Cyclohexane

A mixture of 5.2 parts of the above n-propyl-1,4-cyclohexanedione and 4.55 parts of malononitrile was stirred at room temperature for three days in the presence of a catalytic amount (about 1%) of β-alanine in sufficient water to dissolve. The resultant semisolid product solidified upon trituration with diethyl ether. The crude product was washed with water and diethyl ether until it became snow-white. After drying, there was thus obtained 7.07 parts (83% of theory) of n-propyl-1,4-bis-(dicyanomethylene)-cyclohexane. From the combined washings another 0.9-part portion was recovered, making the total yield 95% of theory. After recrystallization from ethyl acetate, a sample melted at 114–117° C.

Analysis.—Calcd. for $C_{15}H_{14}N_4$: C, 72.0%; H, 5.6%; N, 22.4%. Found: C, 71.9%; H, 5.6%; N, 22.5%.

Part H.—2-n-Propyl-7,7,8,8-Tetracyanoquinodimethan (PrTCNQ)

A glass reactor fitted with suitable stirring and dropping means was charged with a solution of three parts of the above n-propyl-1,4-bis(dicyanomethylene)cyclohexane in about 110 parts of acetonitrile, and a solution of 6.4 parts of N-bromosuccinimide in about 45 parts of acetonitrile and 2.9 parts of pyridine was added dropwise with stirring. The reaction mixture was stirred for three hours at room temperature and 600 parts of cold water was then added. The red-brown oil which separated was removed and on prolonged stirring slowly solidified. The crude solid 2-n-propyl-7,7,8,8-tetracyanoquinodimethan was collected by filtration and washed with water and diethyl ether. After drying, there was thus obtained 2.5 parts (80% of theory) of the crude product. Purification was effected by chromatography using a commercially available, mildy acidic silicic acid column packing and methylene chloride as the solvent and eluent. The desired n-PrTCNQ was only slightly absorbed on the column while some dark impurities were retained at the top of the column. The purified 2-n-PrTCNQ was obtained in total yield of 70% of theory. A sample was sublimed at 110° C. under a pressure corresponding to 0.2 mm. of mercury and exhibited a melting point of 125–127° C.

Analysis.—Calcd. for $C_{15}H_{10}N_4$: C, 73.2%; H, 4.1%; N, 22.8%. Found: C, 73.4%; H, 4.4%; N, 23.1%.

Part I.—2,5-Dimethyl-1,4-Bis(Dicyanomethylene)-Cyclohexane

In a glass reactor equipped with stirring means a mixture of 11 parts of 2,5-dimethyl-1,4-cyclohexanedione, 10.4 parts of malononitrile, and a catalytic amount (about 1%) of β-alanine in sufficient water to dissolve was warmed until a slurry formed. The slurry was then stirred at room temperature for four days, at the end of which time the semisolid product was washed with water and diethyl ether until it became snow-white. There was thus obtained, after drying, 8.6 parts of a mixture of the cis- and trans-isomers of 2,5-dimethyl-1,4-bis(dicyanomethylene)cyclohexane melting at 180–235° C. On standing, additional product deposited in the combined water/ether washes which was collected by filtration and dried. There was thus obtained 3.2 parts of the product, making the total yield 11.8 parts (62% of theory). An analytical sample of the 2,5-dimethyl-1,4-bis(dicyanomethylene)-cyclohexane was crystallized from ethyl acetate.

Analysis.—Calcd. for $C_{14}H_{12}N_4$: C, 71.2%; H, 5.1%; N, 23.7%. Found: C, 71.2%; H, 5.2%; N, 23.3%.

Part J.—2,5-Dimethyl-7,7,8,8-Tetracyanoquinodimethan (Me₂TCNQ)

A glass reactor equipped with suitable stirring and dropping means was charged with 2.36 parts of the above 2,5-dimethyl-1,4-bis(dicyanomethylene)cycloexane in solution in about 80 parts of acetonitrile. A mixture of 3.2 parts of liquid bromine and 3.14 parts of pyridine was added dropwise with stirring. The reaction mixture was stirred for a total of four hours at room temperature and then added to a threefold volume of cold water. The resulting solid was removed by filtration and dried, thereby affording 4.2 parts of crude Me₂TCNQ. On recrystallization from acetonitrile there was obtained 1.4 parts of pure Me₂TCNQ as brown needles melting at 265–267° C. The acetonitrile mother liquor from the recrystallization yielded, on suitable processing, an additional 0.15 part of Me₂TCNQ melting at 260–266° C., thereby making the combined yield 1.55 parts (67% of theory).

*Analysis.*—Calcd. for $C_{14}H_8N_4$: C, 72.4%; H, 3.5%; N, 24.1%. Found: C, 72.5%; H, 3.7%; N, 23.9%.

The C-alkyl-1,4-cyclohexanediones from which the 1,4-bis(dicyanomethylene)alkylcyclohexadiene intermediates of the present invention are prepared, as per the preceding Example I, Parts D–J, are themselves conveniently obtained by the Birch reduction with sodium and liquid ammonia in ethanol of the diethers of the corresponding C-alkylhydroquinones, some of which are available commercially, in accord with the following stoichiometry, using dimethyl sulfate and accordingly the dimethyl ether as illustrative.

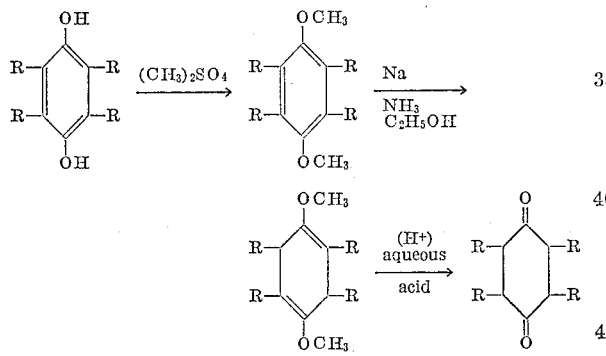

As given in detail in the foregoing Example I, Parts D–J, for the specific 2-methylsubstituted-1,4-bis(dicyanomethyl)cyclohexane and -cyclohexadienes there involved, the preparative techniques therefore are substantially identical with those given in detail in the preceding discussions for the compounds without the methyl substituent. In similar fashion, the mono-, di-, tri-, and tetraalkyl-substituted bis(dicyanomethylene) compounds are prepared. More specifically, using 2,3-dimethyl-1,4-cyclohexanedione and malononitrile, there are obtained 2,3-dimethyl-1,4-dicyanomethylenecyclohexane and -cyclohexadiene. Similarly, from 2,3,5-trimethyl- and 2,3,5,6-tetramethylcyclohexane-1,4-diones, there are obtained the corresponding 2,3,5-trimethyl- and 2,3,5,6-tetramethyl-1,4-dicyanomethylenecyclohexanes and -cyclohexadienes. Similarly, from 2-n-octylcyclohexane-1,4-dione and malononitrile there are obtained 2-n-octyl-1,4-dicyanomethylenecyclohexane and -cyclohexadiene. From 2-isopropyl-1,4-cyclohexanedione and 2-tertiary butyl-1,4-cyclohexanedione with malononitrile, there are obtained the corresponding 2-isopropyl- and 2-tertiary butyl-1,4-dicyanomethylene-substituted cyclohexanes and cyclohexadienes.

As the degree of chain branching in the various alkyl, i.e., monovalent saturated, hydrocarbyl substituents increases and as the number of carbons in said substituents also increases, molecular packing factors tend to make the preparation of the compounds with increasing number of such substituents more difficult. However, within the realms of the 8-carbon atom limit assigned to each alkyl substituent on the 2-, 3-, 5-, and 6-ring carbons, it is possible to prepare tetrakis straight chain hydrocarbyl substituted compounds. More specifically, from 2,3,5,6-tetrakis-n-octyl-1,4-cyclohexanedione and malononitrile, the corresponding 2,3,5,6-tetrakis(n-octyl)-1,4-dicyanomethylenecyclohexane and -cyclohexadiene are obtained.

Part K.—Potassium 7,7,8,8-Tetracyanoquinodimethanide

To a warm solution of 0.5 part of TCNQ in 30 parts of acetonitrile was added 0.5 part of potassium iodide in about 8.0 parts of methanol solution. The resulting dark green solution was allowed to cool to room temperature over a period of two hours. After cooling in an ice/water bath, the solid product was removed by filtration. After drying on the filter, there was thus obtained 0.41 part (69% of theory) of the charge-transferanion-radical salts, potassium tetracyanoquinodimethanide, as large maroon crystals which soften and become tarry above 364° C.

*Analysis.*—Calcd. for $C_{12}H_4N_4K$: C, 59.2%; H, 1.7%; N, 23.0%, K, 16.1%. Found: C, 59.5%; H, 2.1%; N, 22.8%; K, 15.7%.

EXAMPLE II

In 298 parts of boiling chloroform was dissolved 0.41 part of TCNQ and to the almost boiling solution was added all at once a hot solution of 0.29 part of diaminodurene hydroiodide in 7.9 parts of ethyl alcohol. The reaction mixture was allowed to cool down and stand for one hour at room temperature. The blue-black needles of the complex were removed by filtration and washed with chloroform. After drying on the filter, there was obtained 0.43 part (73% of theory) of the 2/1 TCNQ/4-amino-2,3,5,6-tetramethylanilinium charge-transfer compound as blue-black needles melting above 300° C.

*Analysis.*—Calcd. for $C_{34}H_{25}N_{10}$: C, 71.0%; H, 4.4%; N, 24.4%. Found: C, 71.1%; H, 4.4%; N, 24.0%.

EXAMPLE III

In about 1200 parts of boiling chloroform there was dissolved 2.0 parts of tetracyanoquinodimethan. The solution was filtered and, while still hot, a boiling solution of 1.6 parts of 5,8-dihydroxyquinoline in about 375 parts of chloroform was added thereto at once. Almost immediately the black, crystalline, solid complex separated. When the mixture had cooled to room temperature, the black, crystalline, solid complex was removed by filtration, washed on the filter with chloroform, and finally dried. There was thus obtained 2.6 parts (72% of theory) of the black 1:1 microcrystalline TCNQ/dihydroxyquinoline charge transfer complex, exhibiting a decomposition point of 168–169° C.

*Analysis.*—Calcd. for $C_{21}H_{11}N_5O_2$: C, 69.0%; H, 3.0%; N, 19.2%. Found: C, 69.0%; H, 3.4%; N, 19.0%.

The charge transfer complex dissolved in acetone to give a light green solution. A portion of this solution was coated on paper and the coated paper allowed to dry. There remained a black pattern of the solid complex corresponding to the wetted portions. This outline, or pattern, was easily copied, using a commercial thermographic copying machine and method as described in U.S. 2,740,895 and -6. The outline was reproduced in good contrast.

EXAMPLE IV

A solution of 1.64 parts of 2,5-diaminodurene in about 135 parts of tetrahydrofuran was added to a solution of 2.04 parts of tetracyanoquinodimethan in about 445 parts of tetrahydrofuran. A deep blue powder separated immediately which was removed by filtration and washed on the filter with chloroform. After drying there was thus obtained the 1:1 tetracyanoquinodimethan/diaminodurene charge transfer complex as a deep blue powder exhibiting an indefinite decomposition range beginning at about 200° C. and extending to above 300° C.

*Analysis.*—Calcd. for $C_{22}H_{16}N_6$: C, 71.7%; H, 5.4%; N, 22.8%. Found: C, 71.7%; H, 5.8%; N, 22.4%.

The blue, solid charge transfer complex exhibited a strong EPR signal, i.e., was paramagnetic.

Substantially the same results were obtained using chloroform as the reaction medium. Thus, to a boiling solution of 2.04 parts of tetracyanoquinodimethan in about 1125 parts of chloroform was added a solution of 1.64 parts of diaminodurene in about 150 parts of chloroform. The mixture was then cooled to room temperature, and the solid product removed by filtration. After drying there was thus obtained 3.6 parts (98% of theory) of the 1:1 tetracyanoquinodimethan/diaminodurene charge transfer complex as tiny purple platelets exhibiting a broad indefinite decomposition range from 200 to 300° C. The solid complex exhibited a strong EPR signal, i.e., was paramagnetic.

*Analysis.*—Calcd. for $C_{22}H_{16}N_6$: N, 22.8%. Found: N, 22.6%.

In a similar manner to these examples other TCNQ/Lewis base charge transfer complexes were prepared, isolated, and characterized. Data on these other complexes are presented in the following table where THF refers to tetrahydrofuran, DMSO to dimethylsulfoxide, and glyme to ethylene glycol dimethyl ether.

These charge transfer complexes have other uses, both per se and again in the formation thereof. Thus, the TCNQ Lewis base complexes with the stronger Lewis bases are paramagnetic and thus have usefulness in recognized uses for paramagnetic materials. These paramagnetic complexes are generically characterized by exhibiting paramagnetic absorption in the electron paramagnetic resonance spectrum (EPR absorption).

A still further use of the TCNQ/Lewis base charge transfer complexes, which are paramagnetic, resides in an additional characteristic physical property of such complexes. Thus, the TCNQ charge transfer complexes with the stronger pi or Lewis bases exhibit strong, broad absorption in the near infrared region, e.g., from 0.5 to 2.0 microns, generally centered around 1.0 micron. Based on this property, such charge transfer complexes find significant use as the coloring agent, or pigment, in writing inks which make possible reproduction of text matter by thermographic processes.

Thermographic copying represents a convenient and easy method of rapidly copying text material dry. However, operability of the process requires that the text material to be copied must absorb in the infrared. Otherwise there is no heat buildup and accordingly no copy is formed on the thermographic paper. Printed material,

| Expt. No. | Base Component | Solvent | Yield, Percent | TCNQ to Base Ratio | Remarks | M.P. or Dec. Range, °C. | Analysis | | | | | |
|---|---|---|---|---|---|---|---|---|---|---|---|---|
| | | | | | | | Percent Calcd. | | | Percent Found | | |
| | | | | | | | C | H | N | C | H | N |
| 1 | Aminodurenol | $CH_2Cl_2$ | 60 | 1:1 | Black crystals | 168-174 | 71.5 | 5.2 | 19.0 | 71.2 | 5.4 | 19.2 |
| 2 | p-Benzylaminophenol | $CH_2Cl_2$ | 36 | 2:1 | ___do___ | 175 | 73.1 | 3.5 | 20.8 | 72.8 | 3.8 | 20.8 |
| 3 | p-Dimethylaminophenol | $CH_2Cl_2$ | Low | | Black rosettes | 138-141 | | | | | | |
| 4 | N,N-diethyl-p-phenylenediamine | $CHCl_3$ | 55 | 2:1 | Black rods | 144 | 71.3 | 4.2 | 24.5 | 71.1 | 4.4 | 24.3 |
| 5 | N,N-dimethyl-p-phenylenediamine | $CHCl_3$ | 38 | 1:1 | Black leaflets | 112-117 | 70.6 | 4.7 | 24.7 | 70.6 | 4.8 | 24.7 |
| 6 | N,N'-dimethyl-p-phenylenediamine | $CH_2Cl_2$ | 50 | 1:1 | Black needles | 111-114 | 70.6 | 4.7 | 24.70 | 70.4 | 4.9 | 24.0 |
| 7 | N-methyl-p-phenylenediamine | $CH_2Cl_2$ | 86 | | Black crystals | 125-128 | 69.9 | 4.3 | 25.8 | 67.3 | 4.1 | 23.2 |
| 8 | 2-methyl-p-phenylenediamine | $CHCl_3$ | 44 | 1:1 | ___do___ | 150-155 | 69.9 | 4.3 | 25.8 | 69.3 | 4.5 | 25.2 |
| 9 | 1,8-diaminonaphthalene | $CHCl_3$ | 31 | 1:1 | Black plates | 154 | 72.9 | 3.9 | 23.2 | 68.4 | 3.6 | 23.3 |
| 10 | 2,3-diaminonaphthalene | $CHCl_3$ | 27 | 1:1 | Black crystals | 165 | 72.9 | 3.9 | 23.2 | 72.7 | 3.8 | 23.4 |
| 11 | $Cu^+$ | DMSO | 67 | 1:1 | Blue solid | >300 | 53.8 | 1.5 | 20.9 Cu, 23.7 | 53.2 | 2.1 | 20.0 Cu, 23.8 |
| 12 | 2-aminochrysene | $CH_2Cl_2$ | 51 | 1:1 | Brown needles | 211-217 | 80.5 | 3.8 | 15.6 | 80.4 | 3.9 | 15.9 |
| 13 | Nitrilotriethanol | $CH_2Cl_2$ | 57 | 1:1 | Black crystals | 157-161 | 61.2 | 5.4 | 19.8 | 61.5 | 5.3 | 20.2 |
| 14 | t-Butylamine | $CH_2Cl_2$ | 28 | 1:1 | Black needles | | 60.0 | 5.8 | 25.2 | 63.6 | 5.4 | 23.9 |
| 15 | t-Octylamine | $CH_2Cl_2$ | 16 | 1:1 | Purple-red plates | 180-189 | 71.8 | 7.2 | 20.9 | 71.7 | 7.2 | 21.5 |
| 16 | N,N,N',N'-tetramethylbenzidine | $CHCl_3$ | 75 | 1:1 | Black plates | 225-227 | 75.6 | 5.5 | 18.9 | 74.6 | 5.0 | 18.4 |
| 17 | 1,5-diaminonaphthalene | $CHCl_3$ | 59 | 1:1 | Black needles | 197 | 72.9 | 3.9 | 23.2 | 72.4 | 3.8 | 23.8 |
| 18 | N,N,N',N'-tetramethyl-p-phenylenediamine | $CHCl_3$ | 71 | 1:1 | Blue-black plates | 128-129 | 71.7 | 5.4 | 22.8 | 71.7 | 5.6 | 23.2 |
| 19 | p-Phenylenediamine | $CHCl_3$ | 83 | 1:1 | Purple-black plates | 162->300 | 69.2 | 3.9 | | 69.4 | 3.9 | |
| 20 | Copper-8-quinolinolate | $CHCl_3$ | 25 | 1:1 | Black crystals | 195 | 64.7 | 2.9 | 15.1 | 65.4 | 3.2 | 14.1 |
| 21 | ___do___ | $CHCl_3$ | 47 | 1:1 | ___do___ | 195 | | | | 64.7 | 2.9 | 14.7 |
| 22 | Copper pyrrolealdehydeimine | $CHCl_3$ | 69 | 1:1 | Purple needles | 170->300 | 58.2 | 3.1 | 24.7 | 58.2 | 3.1 | 24.5 |
| 23 | 5-amino-8-hydroxyquinoline | $CHCl_3$ | 69 | 1:1 | Black microcrystals | 220->300 | 69.3 | 3.3 | 23.0 | 68.7 | 3.5 | 22.7 |
| 24 | Hydroquinone | THF | Low | 2:1 | | 180-185 | 69.5 | 2.7 | 21.6 | 69.1 | 2.8 | 21.6 |
| 25 | Pyrogallol | $CH_2Cl_2$ | Low | 1:2 | | 104.5 | 63.2 | 3.5 | 12.3 | 63.5 | 4.0 | 12.4 |
| 26 | Anthracene | THF | 42 | 1:1 | | 282-283 | 81.7 | 3.7 | 14.7 | 81.9 | 3.8 | 14.9 |
| 27 | Pyrene | THF | 52 | 1:1 | | 260 | 82.7 | 3.5 | 13.8 | 82.4 | 3.7 | 14.4 |
| 28 | 4,6,8-trimethylazulene | THF | 85 | 1:1 | | 160-167 | 80.2 | 4.8 | 15.0 | 80.4 | 5.0 | 15.0 |
| 29 | Triethylamine | THF | 77 | 2:1 | Black rods | >195 | 70.6 | 4.9 | 24.7 | 70.9 | 4.7 | 24.4 |
| 30 | Trimethylamine | THF | 75 | 2:1 | Blue-black plates | >245 | 69.2 | 3.9 | 26.9 | 69.4 | 3.6 | 27.0 |
| 31 | 1,4-diazabicyclo-(2,2,2)-octane | THF | 17 | 3:2 | Black microcrystals | >270 | 68.7 | 4.6 | 26.7 | 67.5 | 4.9 | 26.5 |
| 32 | ___do___ | THF | 25 | 1:1 | ___do___ | >300 | 68.3 | 5.1 | 26.6 | 68.6 | 4.7 | 26.5 |
| 33 | $Et_3NMe^\oplus$ | THF-MeCN | 64 | 2:1 | Black rods | 265-274 | 71.0 | 5.0 | 24.0 | 71.0 | 4.9 | 24.0 |
| 34 | $Et_4N^\oplus$ | THF-MeCN | 87 | 2:1 | Black crystals | 255-268 | 71.3 | 5.2 | 23.4 | 71.4 | 5.1 | 23.4 |
| 35 | $Na^\oplus$ | glyme-MeCN | 69 | 1:1 | Maroon microcrystals | >300 | 63.4 | 1.8 | 24.4 Na, 10.4 | 63.4 | 1.9 | 24.4 Na, 10.0 |
| 36 | $NH_4^+$ | THF | 36 | 1:1 | ___do___ | >210 | 64.9 | 3.6 | 31.5 | 64.8 | 3.7 | 30.7 |
| 37 | Diisopropylamine | THF | 28 | 2:1 | Black microcrystals | >198 | 70.6 | 4.7 | 24.7 | 70.7 | 4.8 | 24.6 |
| 38 | Ferrocene | $CH_3CN$ | | 2:1 | Black crystals | >130 | | | 18.9 | | | 18.8 |

These charge-transfer complexes of TCNQ with pi or Lewis bases are generally colored, usually with characteristic deep shades of color. Accordingly, the formation of these complexes with TCNQ is basis for a method involving the detection and identification of Lewis bases.

wherein the text matter is in pigmented inks, is satisfactory since the pigment materials for these inks do absorb in the infrared. The same is true of typewritten matter, whether it be the original copy or carbon copies thereof, since again the text matter is defined by carbon particles which absorb in the infrared. However, most fountain pen inks, and in particular ballpoint inks, achieve their characteristic color through the use of dyes, and in some few instances pigments, which do not absorb in the infrared but only in the visible. Accordingly, text matter appearing in these types of inks cannot be copied by a thermographic process. The paramagnetic TCNQ/Lewis base charge transfer complexes in absorbing in the near infrared permit direct, ready, and easy thermographic copying of lettertext matter defined by inks carrying these complexes as the coloring, or pigmenting, agent.

These TCNQ charge transfer complexes are generically colored and accordingly find use in any of the many well-known and established uses for colored materials. Thus, in the case of the colored solutions, these are useful in obtaining decorative color effects. In the case of the TCNQ charge transfer complexes with stronger Lewis bases, the complexes are colored solids irrespective of whether the complex is paramagnetic or not. These colored solid complexes find use in any of the many well-established fields, such as dyes and pigments, for both paints and plastics, and colored fillers for the latter.

Since all the TCNQ charge transfer complexes are colored, the controlled formation thereof forms the basis for still another use, viz., the reproduction of text matter by impact printing, i.e., by the pressure formation of graphic images. Thus, one sheet of a carrier, e.g., paper, is impregnated with a solution of TCNQ and the solvent removed via evaporation, leaving the TCNQ deposited in, on, and through the paper carrier. Another separate sheet of paper is similarly so treated with a Lewis base. A laminate of the two sheets will reproduce a colored image in the second sheet made by pressure on the first sheet.

The present invention is also generic to the charge-transfer compounds of TCNQ with organic and organo-inorganic Lewis bases in crystalline form, including both microcrystal and single crystal form. This latter term is used in its art-recognized sense as meaning an integral body of solid matter containing an ordered periodic arrangement of atoms which extends unchanged throughout the body without discontinuity or change of orientation. As is apparent from the foregoing, these TCNQ/organic or organo-inorganic Lewis base charge-transfer compounds can readily be prepared by contacting TCNQ with the appropriate Lewis base, generally in an inert reaction medium. If the reaction is carried out quickly and at modest temperatures, the charge-transfer compounds are obtained in a polycrystalline state, i.e., as a mass of microcrystals. If, however, the crystals are permitted to form slowly from the inert medium, for instance, by mixing solutions of TCNQ and the appropriate Lewis base, preferably at elevated temperatures, and slowly permitting the reaction medium to cool, single crystals of the TCNQ/Lewis base charge-transfer compounds can readily be obtained. The production of these single crystals will be evident from the examples given in detail below.

Suitable appropriate inert solvents for use in preparing the TCNQ/organic or organo-inorganic Lewis base charge-transfer compounds include the aliphatic and cycloaliphatic ethers, generally the saturated hydrocarbon ethers of preferably eight or more carbon atoms, e.g., di-n-butyl ether and the like (the shorter chain ethers, e.g., diethyl ether, di-n-propyl ether, and the like can frequently be used advantageously in admixture with the longer chain ethers as a means of controlling the solubility/insolubility relationship); the alkylene ethers, cyclic, of generally up to ten carbons such as tetrahydrofuran, tetrahydrosylvan, 1,4-dioxane, and the like; the polyalkylene polyethers of generally more than four carbon atoms, e.g., ethylene glycol dimethyl ether, diethylene glycol dimethyl ether, ethylene glycol diethyl ether, diethylene glycol diethyl ether, and the like; the aliphatic and cycloaliphatic nitriles, generally of up to ten carbon atoms, e.g., acetonitrile, propionitrile; halogenated alkanes having at least one proton, e.g., chloroform, methylene chloride; and the like.

EXAMPLE V

To a solution of two parts of 7,7,8,8-tetracyanoquinodimethan (TCNQ) in 222 parts of anhydroustetrahydrofuran was added 0.542 part of triethylamine. The solution immediately became orange-red in color and, on standing, gradually darkened and finally became deep green. After standing for 21 hours at room temperature, the reaction mixture was filtered to obtain 1.75 parts of the 2/1 tetracyanoquinodimethan/triethylammonium (TCNQ/TEA) charge-transfer compound as black crystals. Concentration of the filtrate afforded an additional 0.74 part of the charge-transfer compound. Total yield was thus 77% of theory. Recrystallization from acetonitrile afforded well-formed flat black rods of the charge-transfer compound about 2.0 x 0.5 x 0.2 mm. in dimensions which, on heating, decomposed with concomitant sublimation above 195° C. The crystals exhibited densities at room temperature of 1.206–1.211.

*Analysis.*—Calcd. for $C_{30}H_{24}N_9$: C, 70.6%; H, 4.9%; N, 24.7%. Found: C, 70.8%; H, 4.9%; N, 24.7%.

Slow recrystallization effected by mounting a closed glass reactor containing a hot saturated acetonitrile solution of the TCNQ/TEA compound in a hot water bath and allowing the bath to cool to room temperature slowly over a period of many hours afforded large rod crystals of the TCNQ/TEA compound about 10 x 5 x 1 mm. in dimensions.

EXAMPLE VI

In a glass reactor a solution of 0.625 part of triethylmethylammonium iodide in a minimum of acetonitrile was added to a warm solution of one part of TCNQ in 160 parts of anhydrous tetrahydrofuran. A brilliant, deep-green color immediately developed. The reaction mixture was allowed to stand at room temperature for 1.5 hours and then concentrated under reduced pressure. When about 30 parts of solvent remained, a small amount of anhydrous diethyl ether was added, and the resultant mixture was filtered. There was thus obtained 0.84 part (65% of theory) of the 2/1 tetracyanoquinodimethan/triethylmethylammonium (TCNQ/TEMA) charge-transfer compound as dark crystals. Recrystallization from acetonitrile afforded the TCNQ/TEMA compound as black rods 0.2 x 0.5 x 3.4 mm. in dimensions, melting at 265–274° C. and exhibiting a density at room temperature of 1.201.

*Analysis.*—Calcd. for $C_{31}H_{26}N_9$: C, 71.0%; H, 5.0%; N, 24.0%. Found: C, 71.0%; H, 4.9%; N, 24.0%.

EXAMPLE VII

In a glass reactor 1.5 parts of tertiary butyldimethylamine was added to a mixture of 4.28 parts of TCNQ, 1.455 parts of p-phenylenedimalononitrile (dihydro TCNQ), and 400 parts of methylene chloride. The resulting dark green mixture was stirred under an atmosphere of nitrogen for 0.75 hour. Most of the solvent was removed by distillation under reduced pressure and the resultant residue was filtered. On drying, there was thus obtained 6.7 parts (94% of theory) of the 2/1 tetracyanoquinodimethan/tertiary butyldimethylammonium (TCNQ/BDMA) charge-transfer compound as black needles. Recrystallization from acetonitrile gave fine black needle crystals 0.50 x 0.07 x 1.30 mm. in dimensions exhibiting a density at room temperature of 1.211.

*Analysis.*—Calcd. for $C_{30}H_{24}H_9$: C, 70.6%; H, 4.9%; N, 24.7%. Found: C, 70.1%; H, 5.0%; N, 25.4%.

EXAMPLE VIII

To a hot (60° C.) solution of two parts of TCNQ in 180 parts of acetonitrile in a glass reactor was added with occasional swirling a room-temperature solution of four parts (excess) of methyltriphenylphosphonium iodide in about 50 parts of acetonitrile. The reactor was immediately closed and placed in a Dewar flask. After two minutes, a seed crystal of the 2/1 tetracyanoquinodimethan/methyltriphenylphosphonium (TCNQ/MeTPP) charge-transfer compound was added and the flask again sealed and the Dewar covered. The reaction mixture was allowed to stand under these conditions for 16 hours and the resultant solid black crystals removed by filtration and washed rapidly with two about 10-part portions of acetonitrile and air-dried. There was thus obtained two parts (60% of theory based on TCNQ) of the TCNQ/MeTPP charge-transfer compound as black prisms 1 x 2 x 4 mm. in dimensions, melting at 231–233° C. with decomposition, and exhibiting a density at room temperature of 1.292.

*Analysis.*—Calcd. for $C_{43}H_{26}N_8P$: C, 75.3%; H, 3.8%; N, 16.3%; P, 4.5%. Found: C, 75.4%; H, 3.9%; N, 16.3%; P, 4.7%.

EXAMPLE IX

The preparation of Example VIII was repeated, substituting a solution of 4.0 parts (excess) of ethyltriphenylphosphonium iodide for the methyltriphenyl phosphonium iodide, varying further only in that the ethyltriphenylphosphonium iodide solution was added at 35° C. There was thus obtained 1.4 parts (41% of theory based on TCNQ) of the 2/1 tetracyanoquinodimethan/ethyltriphenylphosphonium (TCNQ/ETPP) charge-transfer compound as black plates 0.16 x 2.4 x 4.6 mm. in dimensions, melting at 223–225° C. with decomposition, and exhibiting a density at room temperature of 1.284.

*Analysis.*—Calcd. for $C_{44}H_{28}N_8P$: C, 75.5%; H, 4.0%; N, 16.0%; P, 4.4%. Found: C, 75.8%; H, 4.2%; N, 15.9%; P, 4.5%.

EXAMPLE X

The preparation of Example IX was repeated, substituting 4.66 parts (100% excess based on TCNQ) of tetraphenylphosphonium iodide in 94 parts of acetonitrile for the acetonitrile solution of the ethyltriphenylphosphonium iodide. After standing for 40 hours in the Dewar, the reaction mixture was filtered and handled in the same way to afford 1.26 parts (33% of theory based on TCNQ) of the 2/1 tetracyanoquinodimethan/tetraphenylphosphonium (TCNQ/TPP) charge-tranfer compound as black rod crystals 0.6 x 2.1 x 0.4 mm., melting at 228–237° C. with decomposition, and exhibiting a density at room temperature of 1.295.

*Analysis.*—Calcd. for $C_{48}H_{28}N_8P$: C, 77.1%; H, 3.8%; N, 15.0%; P, 4.2%. Found: C, 76.7%; H, 4.0%; N, 16.1%; P, 4.3%.

EXAMPLE XI

The preparation of Example VIII was repeated, substituting 4.4 parts (1.0 molar proportion based on TCNQ) of methyltriphenylarsonium iodide for the methyltriphenylphosphonium iodide. After processing otherwise identically as in Example VIII, there was thus obtained two parts (56% of theory based on TCNQ) of the 2/1 tetracyanoquinodimethan/methyltriphenylarsonium (TCNQ/MeTPA) charge-transfer compound as black, medium-large prisms 1.1 x 3.1 x 3.8 mm. in dimensions, melting at 224–227° C. with decomposition, and exhibiting a room temperature density of 1.397.

*Analysis.*—Calcd. for $C_{43}H_{26}N_8As$: C, 70.8%; H, 3.6%; N, 15.4%; As, 10.3%. Found: C, 71.6%, 69.4%; H, 3.5%; N, 15.1%; As, 10.3%.

When slower crystal-growing techniques were employed i.e., decreasing the temperature of the reaction mixture over an appreciably longer period of time, quite large single crystals of the TCNQ/MeTPA charge-transfer compound were obtained, measuring up to 0.3 x 1.5 x 1.5 cm.

EXAMPLE XII

To a hot (60° C.) solution of 0.612 part of TCNQ in about 55 parts of acetonitrile in a glass reactor was added a solution (60° C.) of 0.789 part (one molar proportion based on the TCNQ) of trimethylphenylammonium iodide in about 16 parts of acetonitrile. The reactor was immediately closed, and after two minutes a seed crystal of the 2/1 tetracyanoquinodimethan/trimethylphenylammonium (TCNQ/TMePA) charge-transfer compound was added. The closed reactor was then placed in a Dewar flask and allowed to stand for 24 hours. The resultant black prisms of the TCNQ/TMePA charge-transfer compound were removed by filtration, washed twice with acetonitrile, and air-dried. There was thus obtained 0.46 part (56% of theory based on TCNQ) of the TCNQ/ TMPA charge-transfer compound as black prisms 0.5 x 1.3 x 1.5 mm. in dimensions, melting at 227–239° C. with decomposition.

*Analysis.*—Calcd. for $C_{33}H_{22}N_9$: C, 72.8%; H, 4.1%; N, 23.2%. Found: C, 72.7%; H, 4.1%; N, 23.2%.

EXAMPLE XIII

The preparation of Example VIII was repeated, substituting 4.62 parts (1.0 molar proportion based on the TCNQ) of ethyltriphenylarsonium iodide for the 4.0 parts of the methyltriphenylphosphonium iodide of Example VIII. There was thus obtained 1.6 parts (44% of theory) of the 2/1 tetracyanoquinodimethan/ethyltriphenylarsonium (TCNQ/ETPA) charge-transfer compound as medium-sized black crystals 0.6 x 3.2 x 0.7 mm. in dimensions, melting at 212–219° C. with decomposition, and exhibiting a room temperature density of 1.342.

*Analysis.*—Calcd. for $C_{44}H_{28}N_8As$: C, 71.1%; H, 3.8%; N, 15.1%; As, 10.1%. Found: C, 71.1%; H, 4.0%; N, 14.8%; As, 10.3%.

EXAMPLE XIV

To a hot (60° C.) solution of 1.02 parts of TCNQ in 58.5 parts of acetonitrile was added a hot (60° C.) solution of 2.78 parts (1.0 molar proportion based on the TCNQ) of tetraphenylstibonium iodide in about 16 parts of acetonitrile. The resulting mixture was allowed to stand at room temperature for one hour and the acetonitrile solvent removed by heating at steam bath temperatures until the volume of the liquid had been reduced to about 40% of its initial value. A seed crystal of the 2/1 tetracyanoquinodimethan/tetraphenylstibonium (TCNQ/TPS)

charge-transfer compound was then added to the hot solution which was then let cool to room temperature. On filtration, there was thus obtained 0.87 part (42% of theory based on TCNQ) of the TCNQ/TPS charge-transfer compound as black rods 0.2 x 1.4 x 0.4 mm. in dimensions and melting at 219–220° C. with decomposition.

*Analysis.*—Calcd. for $C_{48}H_{28}N_8Sb$: C, 68.8%; H, 3.4%; N, 13.4%; Sb, 14.5%. Found: C, 69.1%; H, 3.7%; N, 14.6%; Sb, 14.4%.

EXAMPLE XV

To a solution of 0.1 part of TCNQ in 44 parts of boiling tetrahydrofuran was added a room-temperature solution of 0.15 part of 1,2 - bis(methylthio)-1,2-bis(1-morpholino)-ethylene in 8.8 parts of tetrahydrofluran. The resultant mixture was allowed to stand at room temperature until most of the tetrahydrofuran solvent had evaporated. The resultant black, crystalline solid was collected on a filter and washed with methylene dichloride until the washings were colorless. There was thus obtained 0.12 part (68.5% of theory) of the 2/1 tetracyanoquinodimethan/1,2 - bis(methylthio) - 1,2 - bis(1-morpholino)-ethylene (TCNQ/MTME) charge-transfer compound as black needles melting with decomposition at 182–192° C.

*Analysis.*—Calcd. for $C_{36}H_{30}N_{10}O_2S_2$: C, 62.9%; H, 4.4%; N, 20%. Found: C, 63.6%; H, 4.2%; N, 20.1%.

The charge-transfer compound exhibits a strong EPR absorption.

EXAMPLE XV-A

To a hot (60° C.) solution of 1.02 parts of TCNQ in 90 parts of acetonitrile was added with occasional swirling a hot (60° C.) solution of 2.12 parts (an equimolar proportion based on the TCNQ) of triphenylselenonium iodide in about 35 parts of acetonitrile. A seed crystal of the 2/1 tetracyanoquinodimethan/triphenylselenonium (TCNQ/TPSe) charge-transfer compound, prepared in a previous similar experiment, was added and the glass reactor sealed and placed in a large Dewar flask and allowed to cool spontaneously to room temperature in the closed Dewar. After 30 hours, the resultant crystalline black solid was removed by filtration, washed rapidly with acetonitrile, and air-dried. There was thus obtained 1.38 parts (77% of theory) of 2/1 the TCNQ/TPSe charge-transfer compound as clusters of tiny black prisms melting at 240–245° C. with decomposition.

*Analysis.*—Calcd. for $C_{42}H_{23}N_8Se$: C, 70.2%; H, 3.2%; N, 15.6%; Se, 11.0%. Found: C, 69.8%; H, 3.4%; N, 14.7; Se, 10.2%.

EXAMPLE XVI

To an almost boiling solution of 0.4 part of TCNQ in 23 parts of acetonitrile was added an almost boiling solution of 1.1 parts of morpholine hydroiodide in 23 parts of acetonitrile. The reaction mixture was allowed to cool slowly to room temperature and let stand under these conditions overnight. The reddish-blue prisms were separated by filtration and washed with acetonitrile and chloroform. After drying, there was thus obtained 0.15 part (19% of theory) of the 1/1 TCNQ/morpholinium charge-transfer compound as many-faced, reddish-blue prisms having major dimensions of about 3 x 2 x 2 mm.

*Analysis.*—Calcd. for $C_{16}H_{14}N_5O$: C, 65.8%; H, 4.8%; N, 24.0%. Found: C, 66.1%; H, 5.1%; N, 24.0%.

EXAMPLE XVII

In 32 parts of boiling acetonitrile was dissolved 0.2 part of TCNQ and a hot solution of 0.54 part of morpholine hydroiodide was added. The reaction mixture was treated as described above in Example XVI. There was thus obtained on drying 0.1 part (33% of theory) of the 3/2 TCNQ/morpholinium charge-transfer compound as flat, black plates about 3 x 2 x 0.25 mm. in major dimensions.

*Analysis.*—Calcd. for $C_{44}H_{32}N_{14}O_2$: C, 67.0%; H, 4.1%; N, 24.9%. Found: C, 66.9%; H, 4.3%; N, 24.7%.

EXAMPLE XVIII

To a hot solution of 0.2 part of TCNQ in acetonitrile was added 0.2 part of dihydroTCNQ. When it had dissolved, a hot solution of 0.16 part of pyridine in 7.8 parts of acetonitrile was added and the mixture allowed to stand undisturbed at room temperature. After it had cooled for two hours, the resultant solid was removed by filtration. After drying, there was thus obtained 0.33 part (59% of theory) of the 1/1 TCNQ/pyridinium charge-transfer compound as red reflective prisms. In acetonitrile solution, the product exhibited a visible absorption peak at 394 and 842 millimicrons in, respectively, a peak height ratio of 0.95.

*Analysis.*—Calcd. for $C_{17}H_9N_5$: C, 71.9%; H, 3.5%; N, 24.6%. Found: C, 71.5%; H, 3.7%; N, 23.9%.

EXAMPLE XIX

To a 50° C. solution of 0.61 part of TCNQ and 0.21 part of dihydroTCNQ in 39 parts of acetonitrile was added a warm (about 70° C.) solution of 0.16 part of pyridine in 7.8 parts of acetonitrile. The mixture was quickly cooled in an ice/water bath and fine black needles separated. These were immediately collected by filtration and washed with acetonitrile and chloroform. After drying, there was obtained 0.41 part (42% of theory) of the 2/1 TCNQ/pyridinium charge-transfer compound. In acetonitrile solution, the visible absorption peaks were at 394 and 842 millimicrons in, respectively, a peak height ratio of 1.6.

*Analysis.*—Calcd. for $C_{29}H_{14}N_9$: C, 71.4%; H, 2.9%; N, 25.8%. Found: C, 71.5%; H, 3.3%; N, 25.3%.

EXAMPLE XX

To a hot solution of 0.6 part of TCNQ and 0.2 part of dihydroTCNQ in 39 parts of acetonitrile was added 0.26 part of quinoline. Hair-like, blue-black needle crystals separated immediately. After letting the reaction mixture stand for one hour at room temperature, the product was removed by filtration. After drying, there was obtained 0.92 part (85% of theory) of the 2/1 TCNQ/quinolinium charge-transfer compound, exhibiting a decomposition point above 250° C.

*Analysis.*—Calcd. for $C_{33}H_{16}N_9$: C, 73.6%; H, 3.0%. Found: C, 73.7%; H, 3.7%.

EXAMPLE XXI

To a hot solution of 0.6 part of TCNQ in 31 parts of acetonitrile was added a solution of 0.14 part of quinoline and 0.17 part of hydroquinone in 7.8 parts of acetonitrile. Blue-black needles separated immediately which, after an hour's period at room temperature, were removed by filtration and dried. There was thus obtained 0.63 part (100% of theory) of crystals identical to those obtained immediately above in Example XX. An otherwise identical experiment substituting durohydroquinone for hydroquinone gave exactly the same results.

*Analysis.*—Calcd. for $C_{33}H_{16}N_9$: N, 23.4%. Found: N, 23.6%.

EXAMPLE XXII

To a hot filtered solution of 2.04 parts of TCNQ in about 180 parts of acetonitrile was added a solution of 2.93 parts (0.75 molar proportion based on the TCNQ) of triphenylsulfonium iodide in 25 parts of acetonitrile. The reaction vessel was placed in a Dewar flask and the reaction mixture then seeded with a crystal of the 2/1 TCNQ/triphenylsulfonium charge-transfer compound and the Dewar then closed. After 24 hours at room temperature as the reaction mixture cooled under these conditions, it was filtered and the solid thus obtained washed with acetonitrile and air-dried. There was thus obtained 2.2 parts (65% of theory based on TCNQ) of the 2/1 TCNQ/triphenylsulfonium charge-transfer compound as ribbon crystals melting at 235–240° C. with decomposition. A representative single crystal was 0.4 x 0.9 x 2.3 mm. in dimensions.

*Analysis.*—Calcd. for $C_{42}H_{23}N_8S$: C, 75.1%; H, 3.4%; N, 16.7%; S, 4.8%. Found: C, 75.2%; H, 3.6%; N, 16.6%; S, 4.6%.

EXAMPLE XXIII

A filtered solution of 2.02 parts of methyltriphenylphosphonium iodide and 2.24 parts (an equimolar proportion) of methyltriphenylarsonium iodide in about 50 parts of pure acetonitrile was added to a hot solution of 2.00 parts (an equimolar proportion based on the total phosphonium and arsonium iodides) of TCNQ in about 180 parts of acetonitrile. The reaction mixture was handled as in Example XXII and the reaction mixture seeded with crystals of the 4/1/1 TCNQ/triphenylmethylphosphonium/methyltriphenylarsonium charge - transfer compound. The reaction mixture was allowed to stand under these conditions, cooling slowly overnight, and the solid product was then removed by filtration, washed with acetonitrile, and air-dried. There was thus obtained 1.22 parts (35% of theory based on TCNQ) of the 4/1/1 TCNQ/methyltriphenylarsonium/methyltriphenylphosphonium charge-transfer compound as large, black prisms. An average single crystal was 1.5 x 4.0 x 7.0 mm. in dimensions.

*Analysis.*—Calcd. for $C_{86}H_{52}N_{16}AsP$: N, 15.8%; As, 5.3%; P, 2.2%. Found: N, 15.9%; As, 5.2%; P, 2.7%.

An identical preparation using one of the thus prepared single crystals for seeding afforded 1.75 parts (50% of theory) of the 4/1/1 charge-transfer compound as large, black prisms melting at 227–230° C. with decomposition.

Analysis.—Calcd. for $C_{86}H_{52}N_{16}AsP$: As, 5.3%; P, 2.2%. Found: As, 4.8%; P, 2.2%.

EXAMPLE XXIV

To a hot solution of 2.0 parts of TCNQ in about 180 parts of acetonitrile was added a solution of 2.21 parts (1.0 molar proportion based on the TCNQ) of N-methylpyridinium iodide in about 25 parts of acetonitrile. The reaction mixture was handled as in Example XXII. After standing for 20 hours, slowly cooling, the resultant solid product was removed by filtration. There was thus obtained 0.46 part (17% of theory based on TCNQ) of the 2/1 TCNQ/N-methylpyridinium charge-transfer compound as layered, multirod crystals melting at 249–280° C. with decomposition.

Analysis.—Calcd. for $C_{30}H_{16}N_9$: C, 71.7%; H, 3.2%; N, 25.1%. Found: C, 72.0%; H, 3.2%; N, 24.7%.

EXAMPLE XXV

To a hot solution of 1.00 part of TCNQ in about 75 parts of acetonitrile was added a hot solution of 1.1 parts (0.5 molar proportion based on a 2/1 basis) of N,N′-pentamethylenebis(trimethylammonium iodide) in about 75 parts of acetonitrile. The reaction vessel and mixture were handled as in Example XXII. After slowly cooling under those conditions for 25 hours, the solid product was removed by filtration. After drying there was thus obtained 0.61 part of the 3/1 TCNQ/N,N′-pentamethylenebis(trimethylammonium) charge-transfer compound as purplish black rods melting at 280–300° C. with decomposition. An average single crystal was 0.6 x 0.9 x 6.4 mm. in dimensions.

Analysis.—Calcd. for $C_{47}H_{40}N_{17}$: C, 70.5%; H, 5.0%; N, 24.5%. Found: C, 70.3%; H, 4.5%; N, 24.5%.

EXAMPLE XXVI

To a hot solution of 0.612 part of TCNQ in about 55 parts of acetonitrile was added a solution of 0.939 part (one molar proportion based on the TCNQ) of tetra-n-propylammonium iodide in about 15 parts of acetonitrile. The reaction mixture was allowed to cool slowly to room temperature and let stand two weeks under these conditions. The acetonitrile solvent was then removed by distillation until only a few parts were left. The resultant solid was removed by filtration and dried. There was thus obtained 0.05 part (6% of theory) of the 2/1 TCNQ/tetra-n-propylammonium charge-transfer compound as black ribbon crystals. A typical crystal was 0.4 x 0.9 x 2.3 mm. in dimensions.

Analysis.—Calcd. for $C_{36}H_{36}N_9$: C, 72.7%; H, 6.1%; N, 21.2%. Found: C, 72.2%; H, 5.7%; N, 20.8%.

The following examples illustrate the preparation of lithium TCNQide and metatheses based thereon.

EXAMPLE XXVII

A solution of 50 parts of lithium iodide in about 40 parts of acetone was added to a mixture of 30 parts of TCNQ in about 235 parts of acetonitrile. The reaction mixture was heated at steam bath temperatures for 90 minutes and the solid product removed by filtration. After washing with benzene and petroleum ether and air-drying on the filter, there was obtained 31 parts (100% of theory) of the lithium salt of the anion-radical 7,7,8,8-tetracyanoquinodimethanide, i.e., LiTCNQide. Duplication of the same preparation, but using sufficient acetonitrile to dissolve all the TCNQ at the reflux, afforded the lithium TCNQide in 96% yield as a blue powder.

Analysis.—Calcd. for $C_{12}H_4N_4Li$: C, 68.2%; H, 1.9%; N, 26.5%; Li, 3.3%. Found: C, 68.8%; H, 2.3%; N, 26.4%; Li, 2.9%.

EXAMPLE XXVIII

A one-part sample of barium iodide was added to a boiling solution of 1.2 parts of TCNQ in about 115 parts of acetonitrile. The resulting purple precipitate was removed by filtration, washed with acetonitrile and water, and dried. The barium bis(TCNQide) was obtained in quantitative yield as a blue powder soluble in both acetone and methanol, and insoluble in both water and acetonitrile but soluble in a mixture of the latter two.

Analysis.—Calcd. for $C_{24}H_8N_8Ba$: C, 52.8%; H, 1.5%; N, 20.5%; Ba, 25.2%. Found: C, 53.3%; H, 1.9%; N, 19.4%; Ba, 24.8%.

EXAMPLE XXIX

To four parts of TCNQ in about 160 parts of boiling acetonitrile was added 5.2 parts of cesium iodide in about 80 parts of methanol. On cooling, dark, shiny needles separated from solution. These were isolated by filtration and washed with acetonitrile. After drying, the 1/1.5 or 2/3 cesium/TCNQ charge-transfer compound was obtained in an essentially quantitative yield as dark purple crystals showing no apparent change on heating to 300° C. Polarographic analysis, visible, and ultraviolet spectra all confirmed the presence of 0.5 molar proportion of neutral TCNQ, i.e., TCNQ°, per molar proportion of TCNQanion-radical, i.e., TCNQ$^{[-]}$.

Analysis.—Calcd. for $C_{18}H_6N_6Cs$: C, 49.4%; H, 1.4%; N, 19.1%; Cs, 30.3%. Found: C, 49.4%; H, 1.6%; N, 19.3%; Cs, 28.9%.

EXAMPLE XXX

A solution of four parts of lithium TCNQide in 400 parts of water was added to a solution of 3.7 parts of tetra-n-butylammonium iodide in 100 parts of water. The resultant blue-green precipitate was isolated by filtration and dried under reduced pressure. There was thus obtained 8.4 parts (99.4% of theory) of the 1/1 tetra-n-butylammonium TCNQide anion-radical salt as a blue-green powder melting at 135° C.

Analysis.—Calcd. for $C_{28}H_{40}N_5$: C, 75.3%; H, 9.0%; N, 15.7%. Found: C, 75.9%; H, 9.2%; N, 15.7%.

In essentially an identical manner the following quaternary TCNQide salts were prepared in substantially quantitative yield by metathesis of lithium TCNQide with the respective quaternary halide. Thus, from triethylammonium chloride and lithium TCNQide there was obtained triethylammonium TCNQide as a blue powder, which in crystal form is purple.

Analysis.—Calcd. for $C_{18}H_{20}N_5$: C, 70.6%; H, 6.5%; N, 22.9%. Found: C, 70.4%; H, 6.3%; N, 23.1%.

Similarly, from diethylmethylcyanomethylammonium iodide and lithium TCNQide there was obtained diethylmethylcyanomethylammonium TCNQide as a blue crystalline product melting at 195° C.

Analysis.—Calcd. for $C_{19}H_{19}N_6$: C, 68.9%; H, 5.7%; N, 25.4%. Found: C, 68.3%; H, 5.4%; N, 25.4%.

Similarly, from 1,1,1-triethylhydrazinium chloride and lithium TCNQide there was obtained 1,1,1-triethylhydrazinium TCNQide as a blue crystalline product melting at 185° C.

Analysis.—Calcd. for $C_{18}H_{21}N_6$: C, 67.3%; H, 6.5%; N, 26.2%. Found: C, 66.0%; H, 6.5%; N, 25.1%.

Similarly, from tris(dimethylamino)sulfonium fluoride and lithium TCNQide, there was obtained tris(dimethylamino)sulfonium TCNQide as a deep purple solid melting at 155° C. with decomposition.

Analysis.—Calcd. for $C_{18}H_{22}N_7S$: N, 26.7%; S, 8.7%. Found: N, 26.5%; S, 8.5%.

Similarly, from tetrakis(dimethylamino)phosphonium chloride and lithium TCNQide, there was obtained tetrakis(dimethylamino)phosphonium TCNQide contaminated with a little dimethylamine hydrochloride as dark purple crystals.

Analysis.—Calcd. for $C_{20}H_{28}N_8P$: N, 27.2%; P, 7.6%. Found: N, 23.0%; P, 5.3%.

Similarly, from N-methylpyridinium iodide and lithium TCNQide there was obtained N-methylpyridinium TCNQide as purple micro-crystals melting at 234° C.

*Analysis.*—Calcd. for $C_{18}H_{12}N_5$: C, 72.5%; H, 4.0%. Found: C, 72.6%; H, 4.1%.

By metathesis between lithium TCNQide and methyl triphenylphosphonium iodide there was obtained methyl triphenylphosphonium TCNQide as a blue-colored powdery product melting at 170° C. and purple in crystal form.

*Analysis.*—Calcd. for $C_{31}H_{22}N_4P$: C, 27.3%; H, 4.6%; N, 11.6%; P, 6.4%. Found: C, 77.1%; H, 4.7%; N, 11.4%; P, 6.6%.

Similarly, from trimethyl t-butylammonium iodide and lithium TCNQide, trimethyl t-butylammonium TCNQide was obtained as a black-colored solid.

*Analysis.*—Calcd. for $C_{19}H_{22}N_5$: C, 71.2%; H, 6.9%; N, 21.9%. Found: C, 71.1%; H, 6.6%; N, 22.3%.

Similarly, from lithium TCNQide and 4-cyano-1-methylpyridinium iodide there was obtained 4-cyano-1-methylpyridinium TCNQide as long thin purple needles melting at 224–226° C.

*Analysis.*—Calcd. for $C_{19}H_{11}N_6$: C, 70.6%; H, 3.4%; N, 26.0%. Found: C, 70.8%; H, 3.4%; N, 25.8%.

Similarly, from lithium TCNQide and 1-methylquinolinium iodide there was obtained 1-methylquinolinium TCNQide as reflective red crystals melting at 240–244° C.

*Analysis.*—Calcd. for $C_{22}H_{14}N_5$: C, 75.9%; H, 4.1%; N, 20.1%. Found: C, 75.8%; H, 3.9%; N, 19.9%.

Similarly, from lithium TCNQide and 4-cyano-1-methylquinolinium iodide there was obtained 4-cyano-1-methylquinolinium TCNQide as reflective red crystals melting at 196–198° C.

*Analysis.*—Calcd. for $C_{23}H_{13}N_6$: C, 74.0%; H, 3.5%; N, 22.6%. Found: C, 74.3%; H, 3.7%; N, 21.9%.

Similarly, from lithium TCNQide and 1-methyl-8-hydroxyquinolinium iodide there was obtained 1-methyl-8-hydroxyquinolinium TCNQide as shiny purple crystals melting at 192° C.

*Analysis.*—Calcd. for $C_{22}H_{14}N_5O$: C, 72.5%; H, 3.9%; N, 19.2%. Found: C, 72.1%; H, 4.1%; N, 18.9%.

EXAMPLE XXXI

To a solution of three parts of cesium chloride in 50 parts of water was added a solution of lithium TCNQide in 300 parts of water. The resulting precipitate was removed by filtration, washed with water, and dried under reduced pressure. There was thus obtained 4.6 parts (95% of theory) of cesium TCNQide as a blue powdery solid.

*Analysis.*—Calcd. for $C_{12}H_4N_4Cs$: C, 42.7%; H, 1,2%; N, 16.6%; Cs, 39.6%. Found: C, 42.3%; H, 2.0%; N, 16.3%; Cs, 37.0%.

In substantially the same manner other metallic TCNQide salts have been prepared in substantially quantitative yield. Thus, from silver nitrate and lithium TCNQide there was obtained silver TCNQide as a blue, light-sensitive powder.

*Analysis.*—Calcd. for $C_{12}H_4N_4Ag$: C, 46.2%; H, 1.3%; N, 18.0%; Ag, 34.6%. Found: C, 45.6%; H, 1.6%; N, 16.5%; Ag, 33.6%.

From manganese dichloride and lithium TCNQide there was obtained manganese(II) bis(TCNQide) trihydrate as a blue powdery solid decomposing at 170° C.

*Analysis.*—Calcd. for $C_{24}H_8N_8Mn \cdot 3H_2O$: C, 55.7%; H, 2.7%; N, 21.7%; Mn, 10.6%. Found: C, 56.8%; H, 2.6%; N, 21.1%; Mn, 10.7%.

From ferrous sulfate and lithium TCNQide there was obtained iron(II) bis(TCNQide) trihydrate as a blue powdery solid.

*Analysis.*—Calcd. for $C_{24}H_8N_8Fe \cdot 3H_2O$: C, 55.6%; H, 2.7%; N, 21.6%; Fe, 10.8%. Found: C, 56.4%; H, 2.4%; N, 20.7%; Fe, 10.9%.

From cobalt sulfate and lithium TCNQide there was obtained cobalt(II) bis(TCNQide) trihydrate as a blue powdery solid decomposing at 170° C.

*Analysis.*—Calcd. for $C_{24}H_8N_8Co \cdot 3H_2O$: C, 55.3%; H, 2.7%; N, 21.5%; Co, 11.3%. Found: C, 56.1%; H, 2.5%; N, 21.5%; Co, 11.2%.

From nickel dichloride and lithium TCNQide there was obtained nickel(II) bis(TCNQide) trihydrate as a blue powdery solid decomposing at 170° C.

*Analysis.*—Calcd. for $C_{24}H_8N_8Ni \cdot 3H_2O$: C, 55.3%; H, 2.7%; N, 21.5%; Ni, 11.3%. Found: C, 56.7%; H, 2.6%; N, 21.6%; Ni, 11.1%.

From cuprous sulfate and lithium TCNQide there was obtained copper(I) (TCNQ)°(TCNQide) as a green powdery solid.

*Analysis.*—Calcd. for $C_{24}H_8N_8Cu$: C, 61.1%; H, 1.7%; N, 23.8%; Cu, 13.5%. Found: C, 60.3%; H, 1.9%; N, 23.6%; Cu, 13.3%.

Similarly, from tetramminecopper(II) sulfate hydrate and lithium TCNQide there was obtained diamminecopper(I) (TCNQ)°(TCNQide) as a blue powdery product.

*Analysis.*—Calcd. for $C_{24}H_{14}N_{10}Cu$: C, 57.0%; H, 2.8%; N, 27.7%; Cu, 12.6%. Found: C, 56.1%; H, 3.4%; N, 27.7%; Cu, 11.9%.

Similarly, from lithium TCNQide, copper sulfate pentahydrate, and ethylenediamine there was obtained bis (ethylenediamine) copper(II) bis(TCNQide) as a blue powdery solid.

*Analysis.*—Calcd. for $C_{28}H_{24}N_{12}Cu$: C, 56.8%; H, 4.1%; N, 28.4%; Cu, 10.7%. Found: C, 56.9%; H, 3.9%; N, 26.9%; Cu, 10.8%.

Similarly, from cerium(III) nitrate hexahydrate and lithium TCNQide there was obtained cerium(III) tris (TCNQide) hexahydrate as a blue, light-sensitive powdery solid.

*Analysis.*—Calcd. for $C_{37}H_{12}N_{12}Ce \cdot 6H_2O$: C, 50.2%; H, 2.5%; N, 19.5%; Ce, 16.3%. Found: C, 50.2%; H, 3.2%; N, 19.7%; Ce, 16.1%.

Similarly, from lead(II) nitrate and lithium TCNQide there was obtained lead(II) bis(TCNQide) sesquihydrate as a blue solid.

*Analysis.*—Calcd. for $C_{24}H_8N_8Pb \cdot 1.5H_2O$: C, 44.9%; H, 1.7%; N, 17.4%; Pb, 32.3%. Found: C, 44.7%; H, 1.7%; N, 16.3%; Pb, 32.6%.

Similarly, from samarium trinitrate and lithium TCNQide there was obtained samarium(III) tris (TCNQide) hexahydrate as a blue solid product.

*Analysis.*—Calcd. for $C_{36}H_{12}N_{12}Sm \cdot 6H_2O$: C, 49.6%; H, 2.8%; N, 19.3%. Found: C, 51.1%; H, 2.8%; N, 19.2%.

Similarly, from lithium TCNQide, ferrous sulfate heptahydrate, and o-phenanthroline there was obtained tris (o-phenanthroline)iron(II) bis (TCNQide) hexahydrate as a black solid melting at 260° C.

*Analysis.*—Calcd. for $C_{60}H_{32}N_{14}Fe \cdot 6H_2O$: C, 64.8%; H, 4.0%; N, 17.6%; Fe, 5.0%. Found: C, 64.0%; H, 3.8%; N, 17.8%; Fe, 5.1%.

Similarly, from bis(o-phenanthroline) nickel(II) dichloride and lithium TCNQide there was obtained bis (o-phenanthroline) nickel(II) bis(TCNQide) hexahydrate as a green powdery solid.

*Analysis.*—Calcd. for $C_{48}H_{24}N_{12}Ni \cdot 6H_2O$: C, 61.6%; H, 3.8%; N, 18.0%; Ni, 6.3%. Found: C, 61.7%; H, 3.9%; N, 18.0%; Ni, 5.7%.

Similarly, from lithium TCNQide, nickel(II) dichloride hexahydrate, and o-phenanthroline there was obtained tris(o-phenanthroline) nickel(II) bis(TCNQide) hexahydrate as a green powdery solid.

*Analysis.*—Calcd. for $C_{60}H_{32}N_{14}Ni \cdot 6H_2O$: C, 64.6%; H, 4.0%; N, 17.6%; Ni, 5.3%. Found: C, 66.0%; H, 3.8%; N, 17.8%; Ni, 4.6%.

Similarly, from lithium TCNQide and bis(2-pyridylamine) copper(II) dichloride there was obtained bis(2-pyridylamine) copper(II) bis (TCNQide) as a black solid.

*Analysis.*—Calcd. for $C_{34}H_{17}N_{11}Cu$: C, 63.5%; H, 2.6%; N, 24.0%; Cu, 9.9%. Found: C, 61.7%; H, 2.8%; N, 23.7%; Cu, 9.8%.

Similarly, from chromium triacetate and lithium TCNQide there was obtained the double salt chromium(III) triacetate·chromium(III) acetate hydroxide (TCNQide) hexahydrate, i.e., dichromium tetraacetate hydroxide (TCNQide) hexahydrate as a blue solid.

*Analysis.*—Calcd. for $C_{20}H_{17}O_9N_4Cr_2 \cdot 6H_2O$: C, 35.8%; H, 4.3%; N, 8.4%; Cr, 15.5%. Found: C, 35.9%; H, 4.3%; N, 8.7%; Cr, 15.6%.

EXAMPLE XXXII

To a hot solution of 0.8 part of TCNQ in 78 parts of acetonitrile was added a hot solution of 0.52 part (0.5 molar proportion based on the TCNQ) of 4-cyano-1-methylpyridinium iodide in about 15 parts of acetonitrile. The resultant mixture was allowed to stand at room temperature overnight and the solid product removed therefrom by filtration. After washing with acetonitrile, chloroform, and ether on the filter and subsequent drying, there was thus obtained 0.42 part (40% of theory) of the 2/1 TCNQ/4-cyano-1-methylpyridinium charge transfer compound as blue-black, fine needles melting at 258–260° C.

*Analysis.*—Calcd. for $C_{31}H_{15}N_{10}$: C, 70.5%; H, 2.9%; N, 26.6%. Found: C, 71.0%; H, 3.4%; N, 26.8%.

In a similar manner from TCNQ and 1-methylquinolinium iodide there was obtained the 2/1 TCNQ/1-methylquinolinium charge-transfer compound as blue-black needles melting at 245–250° C. with decomposition.

*Analysis.*—Calcd. for $C_{34}H_{18}N_9$: C, 73.9%; H, 3.3%; N, 22.8%. Found: C, 73.1%; H, 3.9%; N, 23.8%.

In a similar manner from TCNQ and 4-cyano-1-methylquinolinium iodide there was obtained the 2/1 TCNQ/4-cyano-1-methylquinolinium charge-transfer compound as blue-black needles melting with decomposition at 223–229° C.

*Analysis.*—Calcd. for $C_{35}H_{17}N_{10}$: C, 72.7%; H, 2.9%; N, 24.2%. Found: C, 72.2%; H, 3.5%; N, 25.0%.

To a boiling solution of 0.35 part of nickel pyrrolealdehydeimine in 670 parts of methylene dichloride was added a boiling solution of 0.2 part of TCNQ in 134 parts of methylene dichloride. The resultant mixture was quickly cooled in an external ice/water bath and the resultant solid collected by filtration. After drying, there was thus obtained 0.33 part (60% of theory) of the nickel pyrrolealdehydeimine TCNQ pi complex as blue-black needles melting at 210–220° C. with decomposition.

*Analysis.*—Calcd. for $C_{22}H_{14}N_8Ni$: C, 58.9%; H, 3.1%; N, 25.0%. Found: C, 58.7%; H, 3.2%; N, 25.2%.

EXAMPLE XXXIII

To a boiling solution of 0.6 part of TCNQ and 0.2 part of $H_2TCNQ$ in 78 parts of acetonitrile was added a solution of 0.156 part of 2,2'-bipyridyl in 11.7 parts of acetonitrile. The reaction mixture was allowed to stand at room temperature for one hour and the resultant blue-black, fine-needle product removed by filtration, washed with acetonitrile and methylene chloride, and finally dried on the filter. There was thus obtained 0.56 part (quantitative yield based on the bipyridyl) of the 2/1 TCNQ/2,2'-bipyridylium charge-transfer compound as blue-black needles melting at 235–268° C. with decomposition.

*Analysis.*—Calcd. for $C_{34}H_{17}N_{10}$: C, 72.2%; H, 3.0%; N, 24.8%. Found: C, 71.9%; H, 3.2%; N, 24.8%.

In a substantially identical manner substituting a solution of 0.26 part of 2,2'-biquinolyl in 23.4 parts of acetonitrile for the above 2,2'-bipyridyl solution, there was obtained 0.58 part (88% of theory) of the 2/1 TCNQ/2,2'-biquinolylium charge-transfer compound as silver gray platelets melting at 244–248° C. with decomposition.

*Analysis.*—Calcd. for $C_{42}H_{21}N_{10}$: C, 75.7%; H, 3.2%; N, 21.1%. Found: C, 76.4%; H, 3.5%; N, 19.7%.

In substantially an identical fashion substituting a boiling solution of 0.45 part of 2-(p-dimethylaminophenylazo)pyridine in 19.5 parts of acetonitrile for the foregoing solutions of bipyridyl and biquinolyl, there was obtained 0.76 part (89% of theory) of the 1/1 TCNQ/2-(p-dimethylaminophenylazo)pyridinium charge-transfer compound as metallic green needles melting at 230–245° C. with decomposition.

*Analysis.*—Calcd. for $C_{25}H_{19}N_8$: C, 69.5%; H, 4.5%; N, 26.0%. Found: C, 69.0%; H, 4.8%; N, 25.8%.

In substantially an identical manner using a solution of 0.45 part of 4-(dimethylaminoazo)benzene in acetonitrile as the source of the cation, there was obtained 0.14 part (20% of theory) of the 1/1 TCNQ/4-(dimethylaminoazo)benzene pi complex as blue-black needles melting at 221–223° C. with decomposition. An identical product was obtained carrying out a similar reaction but omitting the dihydroTCNQ as judged by infrared spectra.

*Analysis.*—Calcd. for $C_{26}H_{19}N_7$: C, 72.7%; H, 4.5%. Found: C, 72.1%; H, 4.6%.

In a substantially identical manner using a solution of 0.36 part of 2-fluorenylamine in 19.5 parts of acetonitrile as the source of the cation, there was obtained 0.62 part (80% of theory) of the 1/1 TCNQ/2-fluorenylamine pi complex as black needles melting at 242° C. with decomposition. An identical product, as judged by infrared spectrum, was obtained when the dihydroTCNQ was omitted.

*Analysis.*—Calcd. for $C_{25}H_{15}N_5$: C, 78.0%; H, 3.9%. Found: C, 78.1%; H, 4.0%.

EXAMPLE XXXIV

A boiling solution of 1.3 parts of 2-(p-dimethylaminophenylazo)-N-methylpyridinum iodide in 19.5 parts of acetonitrile was added to a boiling solution of one part of TCNQ in 62.5 parts of acetonitrile. The reaction mixture was allowed to stand for two hours at room temperature and the solid product removed by filtration, washed with acetonitrile, methylene dichloride, and diethyl ether, and finally dried on the filter. There was thus obtained 1.2 parts (74% of theory) of the 2/1 TCNQ/2-(p-dimethylaminophenylazo) - N - methylpyridinium charge-transfer compound as blue-black microcrystals melting at 248–249° C. with decomposition.

*Analysis.*—Calcd. for $C_{38}H_{26}N_{12}$: C, 70.0%; H, 4.0%; N, 25.8%. Found: C, 69.9%; H, 4.1%; N, 25.5%.

EXAMPLE XXXV

To a boiling solution of 0.68 part of lithium TCNQide in 79 parts of ethanol was added a boiling solution of 1.2 parts of 2-(p-dimethylaminophenylazo)-N-methylpyridinium iodide in 40 parts of ethanol. The reaction mixture was allowed to stand for one hour at room temperature and the solid product removed by filtration and washed with ethanol and ether. After drying on the filter, there was thus obtained 1.1 parts (77% theory) of the 1/1 TCNQ/2-(p-dimethylaminophenylazo) - N - methylpyridinium charge-transfer compound as metallic green platelets melting at 235–277° C. with decomposition.

*Analysis.*—Calcd. for $C_{26}H_{22}N_8$: C, 70.0%; H, 5.0%. Found: C, 70.0%; H, 4.8%.

In a similar manner, an alcoholic solution of n-octadecyltrimethylammonium iodide was treated with an equimolar amount of lithium TCNQide as a 10% solution in boiling alcohol. The reaction mixture was allowed to cool and was then diluted with water. After filtration and drying, there was thus obtained the 1/1 TCNQ/n-octadecyltrimethylammonium charge-transfer compound, i.e., the simple anion-radical salt, as purple microcrystals melting at 155–160° C. with decomposition.

*Analysis.*—Calcd. for $C_{33}H_{50}N_5$: C, 76.6%; H, 9.7%; N, 13.5%. Found: C, 75.6%; H, 9.6%; N, 13.0%.

To a boiling solution of 0.95 part of cuprous iodide in 78 parts of acetonitrile was added a boiling solution of 1.0 part of lithium TCNQide in 97 parts of acetonitrile. The reaction mixture was allowed to stand at room temperature for two hours and the resultant solid removed by filtration and dried. There was thus obtained 0.75 part (57% of theory) of cuprous TCNQide, i.e., the simple 1/1 anion-radical salt (volume resistivity, 150).

*Analysis.*—Calcd. for $C_{12}H_4N_4Cu$: Cu, 23.7% Found: Cu, 23.7%.

Similarly, from boiling solutions of 0.34 part of N,N'-dimethylphenazinylium iodide in 62 parts of acetonitrile and 0.21 part of lithium TCNQide in 19 parts of ethanol, there was obtained after cooling, filtering, and drying 0.37 part (90% of theory) of the 1/1 TCNQ/N,N'-dimethylphenazinylium charge-transfer compound as purple needles melting at 204–207° C. with decomposition.

*Analysis.*—Calcd. for $C_{26}H_{18}N_6$: C, 75.3%; H, 4.4%; N, 20.2%. Found: C, 75.1%; H, 4.4%; N, 20.0%.

Similarly, from boiling solutions of 1.8 parts of tris-(2.2'-bipyridine)ferrous monoiodide monotriiodide in 78 parts of acetonitrile and 1.2 parts of lithium TCNQide in 115 parts of absolute alcohol, there was obtained after cooling, filtering, and drying 1.0 part of the 4/1 TCNQ/tris(2,2'-bipyridine)ferrous complex salt as black crystals melting at 227–230° C. with decomposition.

*Aanlysis.*—Calcd. for $C_{73}H_{40}N_{22}Fe$: N, 23.0%; Fe, 4.2%. Found: N, 23.1%; Fe, 4.0%.

EXAMPLE XXXVI

A hot solution of 0.29 part of diaminodurene monohydroiodide in 79 parts of ethanol was added all at once to a solution of 0.41 part of TCNQ in 300 parts of boiling chloroform. The reaction mixture was allowed to stand at room temperature for one hour, and the solid product was isolated by filtration, washed with chloroform, and finally air-dried on the filter. There was thus obtained 0.43 part (75% of theory) of the 2/1 TCNQ/diaminodurene charge-transfer compound, i.e., the 2/1 TCNQ/4-amino-2,3,5,6-tetramethylanilinium charge-transfer compound, as shiny blue-black needles melting over 300° C.

Analysis.—Calcd. for $C_{32}H_{26}N_{10}S_2$: C, 62.5%; H, N, 24.4%. Found: C, 71.1%; H, 4.4%; N, 24.0%.

EXAMPLE XXXVII

A room-temperature solution of 0.2 part of 1,2-bis(dimethylamino)-1,2-bis(methylthio)ethylene in 22.2 parts of tetrahydrofuran was added to a solution of 0.4 part of TCNQ in 178 parts of boiling tetrahydrofuran. The reaction mixture was allowed to stand overnight at room temperature, and the solid product was then removed by filtration, washed with methylene dichloride, and finally air-dried on the filter. There was thus obtained 0.50 part (83% of theory) of the 2/1 TCNQ/1,2-bis(dimethylamino)-1,2-bis(methylthio)ethylene charge-transfer compound, i.e., the 2/1 TCNQ/1,2-bis(dimethylaminium) - 1,2-bis(methylthio)ethylene charge-transfer compound, as a black, microcrystalline solid melting at 167–194° C. with decomposition.

*Analysis.*—Calcd. for $C_{32}H_{26}N_{10}S_2$: C, 62.5%; H, 4.1%; N, 22.8%. Found: C, 62.7%; H, 4.5%; N, 22.0%.

EXAMPLE XXXVIII

To a boiling solution of 3.0 parts of TCNQ in 156 parts of acetonitrile was added a boiling solution of 3.2 parts of quinoline ethiodide, i.e., N-ethylquinolinium iodide, in 78 parts of acetonitrile. The reaction mixture was allowed to cool to room temperature and allowed to stay at that point for a total time of two hours. The solid crystalline reaction product was removed by filtration, washed on the filter with acetonitrile and finally dried. There was thus obtained 2.4 parts (56% of theory) of the 2/1 TCNQ/N-ethylquinolinium charge-transfer compound as deep blue-black needles melting at about 180–190° C. with decomposition.

*Analysis.*—Calcd. for $C_{35}H_{20}N_9$: C, 74.2%; H, 3.6%; N, 22.3%. Found: C, 74.1%; H, 3.8%; N, 22.2%.

EXAMPLE XXXIX

A hot solution of 1.107 parts of tetra(n-butyl)-ammonium iodide in about 15 parts of acetonitrile was mixed with a hot solution of 0.612 part (an equimolar proportion based on the iodide) of TCNQ in about 55 parts of acetonitrile. The reaction mixture was placed in a Dewar vessel and allowed to cool to room temperature solwly over a period of 22 hours. No crystals had formed and the solvent was allowed to evaporate at room temperature, open to the atmosphere, from the reaction mixture for a period of two weeks, at which point 0.12 part of unreacted TCNQ was removed by filtration. The solvent was allowed to evaporate from the remaining reaction mixture at room temperature open to the atmosphere for an additional week. At the end of this time the solid product was removed by filtration. There was thus obtained 0.081 part of the 2/1 TCNQ/tetra(n-butyl)-ammoinum charge-transfer compound as black prisms melting at 196° C. with decomposition.

*Analysis.*—Calcd. for $C_{40}H_{44}N_9$: C, 73.8%; H, 6.8%; N, 19.4%. Found: C, 73.2%; H, 5.8%; N, 20.2%.

EXAMPLE XL

Morpholinium hydroiodide was dissolved in 1.67 times its weight of deuterium oxide at 50–60° C. and held at this temperature for one-half hour and then stripped to dryness by distillation under reduced pressure. This procedure was repeated twice, and the resultant dry solid was boiled with three portions of diethyl ether, each about 18 times the weight of the sample. The N-deuteromorpholinium deuteroiodide in 23.4 parts of acetonitrile was added all at once to a 70° C. solution of 0.4 part of TCNQ in 23.4 parts of acetonitrile. The reaction mixture was allowed to stand overnight at room temperature and the solid product removed by filtration. After washing on the filter with acetonitrile and diethyl ether and finally air-drying, there was thus obtained 0.30 part (51% of theory) of the 1/1 TCNQ/N,N-dideuteromorpholinium charge-transfer compound as fine red prisms melting at 218–220° C. (dec.).

*Analysis.*—Calcd. for $C_{16}H_{12}D_2N_5O$: C, 65.8%; D+H, 4.8%; N, 23.9%. Found: C, 65.4%; D+H, 5.0%; N, 23.6%.

EXAMPLE XLI

A solution of 1.5 parts, by volume, of 55% deuterium iodide in deuterium oxide was added to 1.25 parts of quinoline. The resultant mixture was evaporated under a stream of nitrogen until the residue was partially crystallized, at which point the solid was triturated with tetrahydrofuran and diethyl ether. On filtration and vacuum drying, there was obtained 2.29 parts of N-deuteroquinolinium iodide as yellow crystals. To a solution of 3.06 parts of TCNQ in 1,000 parts of boiling methylene chloride was added a boiling solution of 1.95 parts of the above N-deuteroquinolinium iodide in 270 parts of boiling methylene chloride. The reaction mixture was allowed to stand for two hours at room temperature, and after filtration, washing with 270 parts of methylene chloride, and drying on the filter, the 2/1 TCNQ/N-deuteroquinolinium charge-transfer compound was obtained as purple-black needles.

*Analysis.*—Calcd. for $C_{33}H_{15}DN_9$: C, 73.5%; N, 23.4%. Found: C, 73.5%; N, 23.5%.

EXAMPLE XLII

To a boiling solution of 2.5 parts of TCNQ in 117 parts of acetonitrile was added at once a boiling solution of 2.8 parts of quinoline propiodide, i.e., N-propylquinolinium iodide, in 62 parts of acetonitrile. The reaction mixture was allowed to cool to room temperature and let stand under these conditions for a total of two hours. The solid reaction product was removed by filtration, washed with acetonitrile, and finally dried. There was thus obtained 2.5 parts (92% of theory) of the 2/1 TCNQ/N-propylquinolinium charge-transfer compound as black mixed plates and rods. The rod crystals measured up to about 9 mm. x 1 mm. x 0.5 mm. Both forms of the crystal melted at 226–228° C. preceded by a slight hazing from 128° and up.

*Analysis.*—Calcd. for $C_{36}H_{22}N_9$: C, 74.5%; H, 3.8%; N, 21.7%. Found: C, 74.8%; H, 4.1%; N, 21.9%.

Similarly, from boiling solutions of 0.8 part of TCNQ in 31 parts of acetonitrile and 1.1 parts of N-phenethylquinolinium iodide, i.e., N-(2-phenylethyl)-quinolinium iodide, in 15.6 parts of acetonitrile, there was obtained after filtration, washing with acetonitrile, and drying 1.0 part (78% of theory) of the 2/1 TCNQ/N-(2-phenylethyl)quinolinium charge-transfer compound as blue-black crystals.

*Analysis.*—Calcd. for $C_{41}H_{24}N_9$: C, 76.7%; H, 3.8%; N, 19.6%. Found: C, 76.7%; H, 4.0%; N, 19.6%.

Similarly, from boiling solutions of 2.44 parts of TCNQ in 118 parts of acetonitrile and 2.2 parts of isoquinoline hydroiodide in 39 parts of acetonitrile, there was obtained after filtration, washing with acetonitrile and methylene chloride, and drying 2.5 parts (78% of theory) of the 2/1 TCNQ/isoquinolinium charge-transfer compound as blue-black crystals melting at 265° C. with decomposition.

*Analysis.*—Calcd. for $C_{33}H_{16}N_9$: C, 73.6%; H, 3.0%. Found: C, 74.2%; H, 3.8%.

Similarly, using acetonitrile solutions of TCNQ and phenanthroline hydroiodide, there was obtained a 67.5% yield of the 2/1 TCNQ/phenanthrolinium charge-transfer compound as blue-black crystals melting at 248–250° C. with decomposition.

*Analysis.*—Calcd. for $C_{36}H_{17}N_{10}$: C, 73.3%; H, 2.9%. Found: C, 74.0%; H, 3.5%.

Similarly, to a boiling solution of 2.4 parts of TCNQ and 0.84 part of $H_2TCNQ$ in 234 parts of acetonitrile was added a solution of 1.16 parts of 4-hydroxyquinoline in 94 parts of acetonitrile. There was obtained after filtration, washing with acetonitrile and methylene chloride, and drying 2.38 parts (54% of theory) of the 2/1 TCNQ/4-hydroxyquinolinium charge-transfer compound as blue-black needles melting at 210–220° C. with decomposition.

*Analysis.*—Calcd. for $C_{33}H_{16}N_9O$: C, 71.5%; H, 2.9%. Found: C, 71.3%; H, 3.1%.

Similarly, from a boiling solution of 0.2 part of TCNQ in 12 parts of acetonitrile and a hot solution of 0.1 part of dimethyldihydrophenazine in eight parts of acetonitrile, there was obtained after filtration, washing with acetonitrile and ether, and drying 0.29 part (97% of theory) of the 2/1 TCNQ/dimethylphenazinylium charge-transfer compound as blue-black needles melting at 203° C. with decomposition.

*Analysis.*—Calcd. for $C_{38}H_{22}N_{10}$: C, 73.8%; H, 3.6%. Found: C, 74.2%; H, 3.8%.

EXAMPLE XLIII

To a hot solution of 0.4 part of TCNQ in 32 parts of acetonitrile was added a solution of 0.36 part of phenazine in 12 parts of acetonitrile. On standing at room temperature, red needles of the 1/1 TCNQ/phenazine pi complex formed. These were removed by filtration and drying and found to melt at 223–225° C. with decomposition, preceded by a yellow sublimate.

*Analysis.*—Calcd. for $C_{24}H_{12}N_6$: C, 75.0%; H, 3.2%. Found: C, 74.8%; H, 3.4%.

EXAMPLE XLIV

A boiling solution of 0.64 part of phenazinylium iodide in 234 parts of acetonitrile was added to a boiling solution of 0.4 part of TCNQ in 39 parts of acetonitrile. Acetonitrile was removed from the reaction mixture by evaporation until the total volume was reduced to 39 parts, at which point the mixture was filtered and the filtrate allowed to evaporate at room temperature and atmospheric pressure. There was thus obtained after filtration, washing with acetonitrile and methylene chloride, and drying 0.16 part of the 1/1 TCNQ/phenazinylium anion-radical salt as blue-black needles melting at 208–210° C. with decomposition.

EXAMPLE XLV

To a boiling solution of 0.15 part of TCNQ in 12 parts of acetonitrile was added a hot solution of a mixture of 0.11 part of dimethyldihydrophenazine and 0.05 part of $H_2TCNQ$ in eight parts of acetonitrile. The reaction mixture was allowed to stand for one hour, and the deep purple crystals therein formed were removed by filtration and warmed with 39 parts of acetonitrile. The insoluble purple needles (0.05 part) of the 1/1 TCNQ/dimethyldihydrophenazinium anion-radical salt were removed by filtration and, after drying, found to melt at 200° C. with decomposition.

*Analysis.*—Calcd. for $C_{26}H_{19}N_6$: C, 75.3%; H, 4.6%. Found: C, 75.1%; H, 4.3%.

Cooling of the second filtrate above afforded a second crop of the anion-radical salt as purple needles.

EXAMPLE XLVI

To a boiling solution of 0.61 part of N-methylphenazinium methosulfate in eight parts of acetonitrile was added a boiling solution of 0.42 part of lithium TCNQide in 40 parts of ethanol. The reaction mixture was cooled in an ice/water bath and the resultant solid removed by filtration, washed with ethanol and ether, and dried. There was thus obtained 0.72 part (90% of theory) of the 1/1 TCNQ/N-methylphenazinium anion-radical salt as purple microneedles.

*Analysis.*—Calcd. for $C_{25}H_{15}N_6$: C, 75.3%; H, 3.8%; N, 21.1%. Found: C, 75.1%; H, 4.0%; N, 20.6%.

Similarly, using N-ethylphenazinium ethylsulfate, the 1/1 TCNQ/N-ethylphenazinium charge-transfer simple anion-radical salt was obtained in 85.5% of the theoretical yield. After recrystallization from acetonitrile, the charge-transfer compound was obtained as black prisms melting at 204–207° C. with decomposition.

*Analysis.*—Calcd. for $C_{26}H_{17}N_6$: C, 75.5%; H, 4.2%; N, 20.3%. Found: C, 75.8%; H, 4.6%; N, 20.5%.

Similarly, phenanthroline methiodide and lithium TCNQide afforded an 86% of the theoretical yield of the 1/1 TCNQ/N-methylphenanthrolinium charge-transfer compound as purple microcrystals recrystallizable from acetonitrile.

*Analysis.*—Calcd. for $C_{25}H_{15}N_6$: C, 75.3%; H, 3.8%; N, 21.1%. Found: C, 75.1%; H, 4.0%; N, 21.0%.

Similarly, from quinoxaline methiodide and lithium TCNQide, there was obtained an 89% of the theoretical yield of the 1/1 TCNQ/N-methylquinoxalinium charge-transfer compound as purple needles recrystallizable from acetonitrile.

*Analysis.*—Calcd. for $C_{21}H_{13}N_6$: C, 72.2%; H, 3.7%; N, 24.1%. Found: C, 72.0%; H, 4.2%; N, 24.4%.

Similarly, from pyrazine methiodide and lithium TCNQide, there was obtained a 68% of the theoretical yield of the 1/1 TCNQ/N-methylpyrazinium charge-transfer compound as purple plates.

*Analysis.*—Calcd. for $C_{17}H_{11}N_6$: C, 68.1%; H, 3.8%; N, 28.1%. Found: C, 69.1%; H, 4.2%; N, 27.4%.

Similarly, N-methylacridinium methylsulfate and lithium TCNQide afforded an 89% of the theoretical yield of the 1/1 TCNQ/N-methylacridinium charge-transfer compound as black needles.

*Analysis.*—Calcd. for $C_{26}H_{16}N_5$: C, 78.4%; H, 4.1%; N, 17.6%. Found: C, 78.3%; H, 4.3%; N, 17.9%.

Similarly, from boiling solutions of 0.85 part of tris(1,10-phenanthroline)ferrous iodide in 39 parts of acetonitrile and 0.42 part of lithium TCNQide in 40 parts of ethanol, there was obtained after standing overnight at room temperature the 1/2 tris(1,10-phenanthroline)ferrous/TCNQ anion-radical salt, i.e., tris(1,10-phenanthroline)ferrou bis(TCNQide). After filtration, washing with cold ethanol, and drying, there was thus obtained 0.79 part (79% of theory) of the salt as black crystals, crushable to a red powder.

*Analysis.*—Calcd. for $C_{60}H_{32}N_{14}Fe$: N, 19.5%; Fe, 5.6%. Found: N, 19.2%; Fe, 5.6%.

Similarly, from boiling solutions of 1.4 parts of tris(o-phenanthroline)ferrous perchlorate tetrahydrate in 19 parts of acetonitrile and 0.77 part of lithium TCNQide in 54 parts of ethanol, there was obtained after letting stand one hour at room temperature, filtration, washing with ethanol and diethyl ether, and finally drying 1.62 parts (90% of theory) of the 1/2 tris(1,10-phenanthroline)ferrous/TCNQ anion-radical salt as red prisms.

*Analysis.*—Calcd. for $C_{60}H_{32}N_{14}Fe$: N, 19.5%; Fe, 5.6%. Found: N, 19.1%; Fe, 5.6%.

EXAMPLE XLVII

To a boiling solution of 1.25 parts of TCNQ in 59 parts of acetonitrile was added a boiling solution of 1.25 parts of tris(1,10-phenanthroline)ferrous iodide in 78 parts of acetonitrile. The reaction mixture was allowed to stand at room temperature for three hours, and the black solid product was removed by filtration, washed with cold acetonitrile and ether, and finally dried. There was thus obtained 1.25 parts (71% of theory) of the 4/1 TCNQ/tris(1,10-phenanthroline)ferrous complex salt as black needles melting at 255–257° C. with decomposition. The complex salt might perhaps better be described as tris(1,10 - phenanthroline)ferrous bis(TCNQ$^+$)bis(TCNQ°).

*Analysis.*—Calcd. for $C_{84}H_{40}N_{22}Fe$: Fe, 4.0%. Found: Fe, 3.9%.

A solution of 0.8 part of the tris(1,10-phenanthroline) ferrous bis(TCNQide) of Example XLVI in 47 parts of boiling acetonitrile was mixed with a solution of 0.33 part of TCNQ in 24 parts of boiling acetonitrile. The mixture was allowed to stand for 1½ hours at room temperature and the solid removed by filtration and dried. There was thus obtained 0.32 part of the 4/1 TCNQ/tris-(1,10-phenanthroline)ferrous complex salt as black needles.

*Analysis.*—Calcd. for $C_{84}H_{40}N_{22}Fe$: N, 21.8%; Fe, 4.0%. Found: N, 21.3%; Fe, 3.9%.

The filtrate from the original reaction mixture was evaporated to a volume corresponding to 43 parts, heated, and filtered hot and allowed to stand overnight at room temperature. After filtration and drying, there was thus obtained 0.24 part of a complex TCNQ/tris(1,10-phenanthroline)ferrous salt as long, black rods up to 1 mm. x 1 mm. x 1 cm. Ultraviolet spectral analysis in acetonitrile solution indicated the complex product to contain at least 8% more combined neutral TCNQ than the foregoing 4/1 product.

EXAMPLE XLVIII

A solution of two parts of lithium TCNQide in 200 parts of water was added to a solution of 2.7 parts of tetrakis(dimethylamino)ethylene dibromide in 50 parts of water. The resultant blue precipitate was isolated by filtration, washed with water, and dried. There was thus obtained 2.8 parts (97% of theory) of the tetrakis(dimethylamino)ethylene/bis(TCNQide). The TCNQide, i.e., the anion radical, was determined spectroscopically.

To a solution of 65 parts of the above tetrakis-(dimethylamino)ethylene/bis(TCNQide) in 78 parts of acetonitrile was added a solution of two parts of TCNQ in 156 parts of acetonitrile. The resultant, fine, black crystals were removed by filtration, washed with acetonitrile, and dried. There was thus obtained 0.87 part (100% of theory) of the 3/1 TCNQ/tetrakis(dimethylamino)-ethylene charge-transfer compound. The ratio of the TCNQide, i.e., the anion radical, to the neutral TCNQ was established by both polarography and absorption spectroscopy as 2:1.

*Analysis.*—Calcd. for $C_{46}H_{36}N_{16}$: C, 70.0%; H, 4.4%; N, 27.6%. Found: C, 66.4%; H, 4.8%; N, 27.5%.

EXAMPLE XLIX

To a solution of 1.188 parts of 2,4,6-triphenylpyrylium fluoborate in about 24 parts of deoxygenated acetone under a blanket of nitrogen was added a solution of 0.633 part (an equimolar proportion based on the fluoborate) of lithium TCNQide in about 80 parts of deaerated acetone. A dark green color formed at once and the reaction mixture was heated at steam bath temperatures until dark-colored crystals appeared and was then heated an additional twenty minutes. On cooling to room temperature and filtration, there was thus obtained 0.68 part (43.5% of theory) of 1/1 TCNQ/2,4,6-triphenylpyrylium charge-transfer compound as dark crystals contaminated with a little lighter-colored solid. The resultant crude 1/1 compound was dissolved in about 80 parts of hot acetonitrile, and a solution of 0.27 part of TCNQ in about 24 parts of hot acetonitrile was added. On cooling, the reaction mixture became gelatinous and the solid product was removed by filtration and dried. There was thus obtained 0.45 part (47% of theory) of the 2/1 TCNQ/ 2,4,6-triphenylpyrylium charge-transfer compound as a dull black solid melting at 270° C. with decomposition.

*Analysis.*—Calcd. for $C_{47}H_{25}N_8O$: C, 78.6%; H, 3.5%; N, 15.6%. Found: C, 78.2%; H, 3.6%; N, 15.2%.

EXAMPLE L

To a boiling solution of 0.1 part of N,N'-dimethyldiacridene in 85 parts of xylene was added a solution of 0.11 part of TCNQ in 15.6 parts of boiling acetonitrile. After filtration and drying, there was thus obtained a 100% of the theoretical yield of the 2/1 TCNQ/N,N'-dimethyldiacridenium charge-transfer compound as metallic green platelets melting at 250° C. with decomposition.

*Analysis.*—Calcd. for $C_{56}H_{30}N_{10}$: C, 78.6%; H, 3.8%. Found: C, 78.2%; H, 4.1%.

The following example illustrates the conversion of the TCNQide anion-radical salts to the more complex TCNQ°/TCNQ⁻ neutral/anion-radical salts.

EXAMPLE LI

A solution of two parts of TCNQ in boiling tetrahydrofuran was added to a solution of 8.2 parts of the 1,1,1-triethylhydrazinium TCNQide of Example XXX. The reaction mixture was allowed to cool to room temperature and the solid product removed by filtration. After drying, there was thus obtained four parts (76% of theory) of the 2/1 TCNQ/1,1,1-triethylhydrazinium charge-transfer compound as black crystals melting above 300° C.

*Analysis.*—Calcd. for $C_{30}H_{25}N_{10}$: C, 68.6%; H, 4.8%. Found: C, 67.7%; H, 4.8%.

Polarographic analysis demonstrated the presence of neutral TCNQ and the TCNQ anion radical in equal amount.

Similarly, when a solution of the above triethylammonium TCNQide (see Example XXX) in acetonitrile was added to a saturated acetonitrile solution of TCNQ, black crystals immediately separated out. On isolation by filtration, followed by drying, there was thus obtained the 2/1 TCNQ/triethylammonium charge-transfer compound (see Example V). Spectroscopic analysis demonstrated equimolar amounts of TCNQ anion radical and neutral TCNQ. The physical properties of this product were identical with those of Example V.

Similarly, from the above tris(dimethylamino)sulfonium TCNQide (see Example XXX) and TCNQ there was obtained the 2/1 TCNQ/tris(dimethylamino)sulfonium charge-transfer compound as black shiny leaflets melting at 229° C.

*Analysis.*—Calcd. for $C_{30}H_{26}N_{11}S$: N, 27.0%; S, 5.6%. Found: N, 26.6%; S, 5.8%.

Similarly, from the above tetrakis(dimethylamino) phosphonium TCNQide (see Example XXX) and additional quantities of TCNQ there was obtained the 2/1 TCNQ/tetrakis(dimethylamino)phosphonium charge-transfer compound.

*Analysis.*—Calcd. for $C_{32}H_{32}N_{12}P$: N, 27.3%; P, 5.0%. Found: N, 27.1%; P, 4.7%.

Similarly, to a solution of 1.0 part of the 1/1 TCNQ/N-methylphenazinium anion-radical salt of Example XLVI in 98 parts of boiling acetonitrile was added a boiling solution of 0.32 part of TCNQ in 27 parts of acetonitrile. The reaction mixture was allowed to stand at room temperature for one hour and the solid product removed by filtration and dried. There was thus obtained 1.09 parts of the crude 2/1 TCNQ/N-methylphenazinium complex charge-transfer compound. After recrystallization from acetonitrile, the product was obtained as purple-black crystals melting at 207–208° C. with decomposition.

*Analysis.*—Calcd. for $C_{37}H_{19}N_{10}$: C, 73.6%; H, 3.2%; N, 23.2%. Found: C, 73.4%; H, 3.5%; N, 23.2%.

Similarly, the 1/1 TCNQ/N-ethylphenazinium anion-radical salt of Example XLVI was treated with TCNQ. There was thus obtained a 70% of the theoretical yield of the 2/1 TCNQ/N-ethylphenazinium complex charge-transfer salt as black, felted needles melting at 220–225° C. with decomposition.

*Analysis.*—Calcd. for $C_{38}H_{21}N_{10}$: C, 73.9%; H, 3.4%; N, 22.7%. Found: C, 73.9%; H, 3.6%; N, 22.7%.

EXAMPLE LII

The 1/1 TCNQ/N-methylacridinium salt of Example XLVI was recrystallized in air from 140 parts of acetonitrile. There was thus obtained 0.61 part of the 2/1 TCNQ/N-methylacridinium complex change-transfer salt as black needles.

*Analysis.*—Calcd. for $C_{33}H_{20}N_9$: C, 75.7%; H, 3.3%; N, 21.0%. Found: C, 75.5%; H, 3.7%; N, 21.7%.

The recrystallization liquor from the above was heated to boiling and treated with a boiling solution of 0.51 part of TCNQ in 39 parts of acetonitrile. After letting the reaction mixture stand for one hour at room temperature, the resultant solid was removed by filtration and dried. After recrystallization from acetonitrile, there was thus obtained 0.52 part of the 2/1 complex TCNQ/N-methylacridinium salt as black needles.

*Analysis.*—Calcd. for $C_{38}H_{20}N_9$: C, 75.7%; H, 3.3%; N, 21.0%. Found: C, 75.5%; H, 3.7%; N, 21.0%.

EXAMPLE LIII

To a boiling solution of 1.28 parts of tris(2,2'-bipyridine)ferrous bis(triiodide) in 47 parts of acetonitrile was added a boiling solution of 0.84 part of lithium TCNQide in 78 parts of absolute ethyl alcohol. The resultant mixture was cooled in an ice/water bath for 30 minutes, and the black, crystalline product was removed by filtration and recrystallized from 39 parts of acetonitrile. The electronic absorption of the product in acetonitrile showed absorption at 394 m$\mu$ and 840 m$\mu$ with a band intensity ratio of 1.6. The related product of the foregoing Example XXXV exhibited a 394/840 m$\mu$ intensity ratio of 2.0. This shows that the present product is a neutral TCNQ° deficient form of the tris(2,2'-bipyridine)ferrous bisTCNQide bisTCNQ° of Example XXXV. The present TCNQ° deficient form exhibited a volume resistivity of 34 ohm-cm.

EXAMPLE LIV

To a boiling solution of one part of the simple N-methylquinoxalinium TCNQ salt of Example XLVI in 39 parts of acetonitrile was added a boiling solution of 0.58 part of TCNQ in 39 parts of acetonitrile. The mixture was allowed to stand at room temperature for one hour, and the blue-black needles were collected and washed on the funnel with acetonitrile and ether. After drying, there was thus obtained 1.0 part of the 2/1 complex Y$_2$/N - methylquinoxalinium/(TCNQ$^-$)(TCNQ°) salt, exhibiting a volume resistivity of 62 ohm-cm.

*Analysis.*—Calcd. for $C_{33}H_{17}N_{10}$: C, 71.6%; H, 3.1%; N, 25.3%. Found: C, 71.0%; H, 3.7%; N, 25.8%.

EXAMPLE LV

To a boiling solution of 1.62 parts of N-methyl-2-styrylpyridinium iodide in a mixture of 31 parts of absolute ethyl alcohol and 7.8 parts of absolute methyl alcohol was added a solution of 1.1 parts of lithium TCNQide in 78 parts of boiling absolute ethyl alcohol. The resultant mixture was allowed to cool to room temperature, and the glistening purple needle product was removed by filtration and washed on the funnel with absolute ethanol and diethyl ether. There was thus obtained 1.72 parts of the 1/1 N-methyl-2-styrylpyridinium/TCNQide simple salt as purple needles exhibiting a volume resistivity of $3.7 \times 10^7$ ohm-cm.

*Analysis.*—Calcd. for $C_{26}H_{18}N_5$: C, 78.0%; H, 4.5%; N, 17.5%. Found: C, 77.1%; H, 4.9%; N, 17.5%.

EXAMPLE LVI

To a hot, filtered solution of 1.0 part of the above 1/1 simple N-methylstyrylpyridinium/TCNQide salt in 78 parts of acetonitrile was added a hot solution of 0.51 part of TCNQ in 39 parts of acetonitrile. The resultant mixture was allowed to stand at room temperature for one hour, and the solid, crystalline product was removed by filtration and washed sparingly with acetonitrile and dichloromethane. After drying, there was thus obtained 1.15 parts of the complex 1/2 N-methyl-2-styrylpyridinium/TCNQ$^-$TCNQ° salt, exhibiting a volume resistivity of 6.6 ohm-cm.

*Analysis.*—Calcd. for $C_{38}H_{22}N_9$: C, 75.5%; H, 3.7%; N, 20.8%. Found: C, 75.6%; H, 3.9%; N, 20.8%.

EXAMPLE LVII

To a solution of 2.5 parts of the dye Safranin O (3,7-diamino-2,8-dimethyl-5-phenylphenazinium chloride) in 100 parts of boiling water was added excess solid lithium perchlorate. The resultant rust-red solid was removed by filtration and vacuum dried, thereby affording the 3,7-diamino - 2,8 - dimethyl - 5 - phenylphenazinium perchlorate. To a boiling, filtered solution of 0.83 part of the above diaminodimethylphenylphenazinium perchlorate in 60 parts of acetonitrile was added a boiling, filtered solution of 0.42 part of lithium TCNQide in 31 parts of absolute ethanol. The resultant mixture was allowed to cool spontaneously to room temperature, and the iridescent green-black needles were removed by filtration and washed on the filter with ethanol and diethyl ether. There was thus obtained 0.52 part of the simple 1/1 3,7. - diamino - 2,8 - dimethyl - 5 - phenylphenazinium/TCNQide salt as green-black needles melting with decomposition at 175–210° C. and exhibiting a volume resistivity of $6.4 \times 10^6$ ohm-cm.

*Analysis.*—Calcd. for $C_{32}H_{23}N_8$: C, 74.0%; H, 4.5%; N, 21.6%. Found: C, 70.4%; H, 5.1%; N, 21.3%.

EXAMPLE LVIII

Example LVII was repeated except that 0.4 part of TCNQ was incorporated in the diaminodimethylphenyl-phenazinium perchlorate solution prior to the addition of the lithium TCNQide. The black needle product of the 1/2 complex 3,7-diamino-2,8-dimethyl-5-phenylphenazinium/TCNQ$^-$TCNQ° salt was obtained in amount of 0.1 part melting with decomposition in a range about 230° C. and exhibiting a volume resistivity of 92 ohm-cm.

*Analysis.*—Calcd. for $C_{44}H_{27}N_{12}$: C, 73.0%; H, 3.8%; N, 23.2%. Found: C, 73.7%; H, 4.1%; N, 23.0%.

EXAMPLE LIX

To 19.5 parts of boiling acetonitrile was added 0.73 part of bis(2,2'-bipyridine)cupric perchlorate and 0.5 part of water. The mixture was boiled for several minutes to dissolve the chelate, and a boiling solution of 0.42 part of lithium TCNQide in 31 parts of absolute ethanol was then added. A black, microcrystalline solid separated immediately. The mixture was filtered hot, and the solid product was washed on the filter with acetonitrile, ethanol, and diethyl ether. There was thus obtained 0.45 part of the simple mono(2,2'-bipyridine)-cupric/bisTCNQide salt as black crystals in amount 0.45 part exhibiting a volume resistivity of 19 ohm-cm.

*Analysis.*—Calcd. for $C_{34}H_{16}N_{10}Cu$: C, 65.0%; H, 2.6%; N, 22.3%; Cu, 10.1%. Found: C, 65.4%; H, 2.8%; N, 22.0%; Cu, 9.9%.

EXAMPLE LX

To a hot solution of 0.62 part of bis(1,10-phenanthroline)cupric perchlorate in 47 parts of acetonitrile was added a boiling solution of 0.43 part of lithium TCNQide in 39 parts of absolute ethanol. The resultant mixture was cooled in an ice/water bath for 15 minutes, and the resultant blue-black solid was removed by filtration and washed as in Example LIX. There was thus obtained after drying 0.33 part of the simple mono(1,10-phenanthroline)cupric bisTCNQide salt exhibiting a volume resistivity of 38 ohm-cm.

*Analysis.*—Calcd. for $C_{36}H_{16}N_{10}Cu$: C, 66.3%; H, 2.5%; N, 21.5%; Cu, 9.7%.

EXAMPLE LXI

Example LX was repeated except that 0.4 part of TCNQ was incorporated in the boiling chelate solution prior to the addition of the lithium TCNQide solution. On filtration, washing, and drying, as before, there was obtained 0.6 part of the complex 1/4 mono(1,10-phenanthroline)cupric/(TCNQ$^\div$)$_2$(TCNQ°)$_2$ salt exhibiting a volume resistivity of 15 ohm-cm. as a deep blue, crystalline solid.

*Analysis.*—Calcd. for $C_{60}H_{24}N_{18}Cu$: C, 67.9%; H, 2.3%; N, 23.8%; Cu, 6.0%. Found: C, 67.2%; H, 3.0%; N, 21.7%; Cu, 7.2%.

EXAMPLE LXII

The following products were prepared by mixing a boiling solution of 11 parts of acetonitrile and one part of the parent metal chelate perchlorate with a boiling absolute ethyl alcohol solution of two molar proportions of lithium TCNQide per molar proportion of the chelate in solution in 80 parts of absolute ethyl alcohol per part of lithium TCNQide. The resultant reaction mixture was cooled, the solid product collected, washed on the filter with ethanol and diethyl ether, and subsequently air dried. The products identified in the following table were thus prepared, identified, and characterized with the indicated yield and volume resistivity values.

| Product | Analysis | Yield, % | Resistivity in Ohm-cm. |
|---|---|---|---|
| Tris (2,2'-bipyridine)-nickelous bisTCNQide. | Calcd. Ni, 6.3%--- <br> Found Ni, 7.0%--- | 54 | 10⁵ |
| Tris(1,10-phenanthroline)cobaltous bis-TCNQide. | Calcd. Co, 5.8%--- <br> Found Co, 5.6%--- | 68 | 10⁷ |
| Tris(1,10-phenanthroline)cupric bis-TCNQide. | Calcd. Cu, 6.3%--- | 64 | 10⁵ |
| Tris(1,10-phenanthroline)manganous bisTCNQide. | Calcd. Mn, 5.5%--- <br> Found Mn, 5.2%--- | 79 | 10³ |
| Tris(1,10-phenanthroline)nickelous bisTCNQide. | Calcd. Ni, 5.8%--- <br> Found Ni, 6.0%--- | 82 | 10⁴ |

EXAMPLE LXIII

The following compounds were prepared by dissolving one part of the parent chelate perchlorate in 10 parts of acetonitrile and adding two molar equivalents based on the chelate of TCNQ in boiling acetonitrile solution (at a concentration of 100 parts of acetonitrile per part of TCNQ), followed by two molar equivalents, again based on the chelate, of lithium TCNQide in boiling absolute ethanol at a concentration of 80 parts thereof per part of lithium TCNQide:

| Product | Analysis | Yield, % | Resistivity in Ohm-cm. |
|---|---|---|---|
| Tris(2,2'-bipyridine)-nickelous bisTCNQide-bisTCNQ°. | Calcd. Ni, 4.4%--- <br> Found Ni, 4.2%--- | 65 | 3×10³ |
| Tris(1,10-phenanthroline)cobaltous bisTCNQide-bisTCNQ°. | Calcd. Co, 4.2%--- <br> Found Co, 3.9%--- | 40 | 10⁴ |
| Tris(1,10-phenanthroline)cupric bis-TCNQide bisTCNQ°. | Calcd. Cu, 4.5%--- <br> Found Cu, 4.1%--- | 66 | 10⁴ |
| Tris(1,10-phenanthroline)nickelous bis-TCNQide bisTCNQ°. | Calcd. Ni, 4.2%--- | 65 | 20C |
| Tris(1,10-phenanthroline)manganous bis-TCNQide bisTCNQ°. | Calcd. Mn, 3.9%--- <br> Found Mn, 3.5%--- | 90 | 140 |

This invention is generic to the charge-transfer compounds of 7,7,8,8-tetracyanoquinodimethan and the alkyl ring-substituted tetracyanoquinodimethans. In the discussion which follows, TCNQ as used elsewhere in the specification will again be symbolic of not only 7,7,8,8-tetracyanoquinodimethan itself but also the various alkyl ring-substituted tetracyanoquinodimethans. There are two broad types of these charge-transfer compounds: (1) those wherein the tetracyanoquinodimethan or alkyl-substituted tetracyanoquinodimethans are present wholly in anion-radical form, i.e., charge-transfer compounds of the type $M^{n+}(TCNQ^\div)_n$, where $M^{n+}$ is a cation (organic and/or inorganic) of charge or valence $n$, wherein $n$ is an integer from 1 to 6, and (2) those wherein the charge-transfer compound contains some of the tetracyanoquinodimethan or alkyl-substituted quinodimethans in anion-radical form and some present in the complex in neutral, i.e., uncharged, form. These latter type charge-transfer compounds are representable by the formula $$M^{n+}(TCNQ^\div)_n(TCNQ°)_m$$

wherein, as before, $M^{n+}$ is a cation of charge $n$ where $n$ as before is an integer from 1 to 6 and $m \leqq n$ and usually $m \leqq n$. In this latter type of compound containing the combined neutral TCNQ, while most of the structures will contain unitized stoichiometric quantities of the said neutral radicals, it is intended that these disclosures are to include the usually possible defect structures wherein either or both the anion or cation will be present in less than stoichiometric quantities with suitable adjustment in the combined quantity of the neutral TCNQ. To illustrate, the invention is equally inclusive of an $$R+/TCNQ^\div/TCNQ°$$

as it is of an 0.9 R+/0.9 TCNQ$^\div$/1.1 TCNQ° compound.

The invention is equally inclusive of the complex anion-radical salts, i.e., the type containing both a combined anion radical of the tetracyanoquinodimethan or alkyl-substituted tetracyanoquinodimethan type and a combined neutral molecule of a different species of one of the cyano compounds, e.g., symbolically represented by the formula M+/(TCNQ, RTCNQ)$^\div$, where R is alkyl. In such mixed anion-radical/neutral complex salts, it is not possible to indicate which of the combined species is the anion radical and which is the neutral species, and in all probability the entities present are equilibrium mixtures of all possible structures.

The charge-transfer compounds of the present invention, comprising the first-discussed class wherein the TCNQ moiety is present wholly in anion-radical form, are best described as simple salts of the TCNQ anion-radical, i.e., TCNQ$^\div$. Physically, the members of this class are distinguished by high electrical resistivities of the order of magnitude of 1×10⁴ ohm-cm. or greater, high activation energies for conductivity of the order of magnitude of 1 ev. or higher, and negative magnetic susceptibilities over the temperature range for −200 to +200° C. The TCNQ$^\div$ radicals in these salts which are generally obtained in crystalline form appear to exist as anion dimers with the electrons completely paired up in the ground state. The cations in these simple charge-transfer anion radical salts can equally well be organic or inorganic.

These simple salts can be prepared directly by simple interaction between a suitable source of the cation and the TCNQ or, preferably, by metathetical reaction between a suitable source of a cation and a conveniently soluble source of the TCNQ anion-radical, e.g., lithium TCNQide which is easily preparable directly from a suitable lithium salt, e.g., lithium iodide, and TCNQ, and has the advantage in further metathetical reactions of good solubility as the simple salt plus the further significant advantage that the by-product lithium salts arising from the metathesis are also usually highly soluble so that they remain in solution while the much less soluble desired charge-transfer product precipitates. In the case of the simple anion-radical salts involving organic cations, the organic quaternary halides are most generally operable. Simple hydrohalide salts of the organic cations often fail to give the simple product because of formation of free TCNQ resulting in the formation of the complex charge-transfer compounds of the second type, discussed above, containing combined neutral TCNQ. However, in the case of the strongly basic organic cations, speaking in the sense of basicity as conferred by an unshared pair of electrons, the organic cation hydrohalide salts are fully operable in the metathesis to give the simple salts. To be specific, for instance, the tris(lower alkyl)ammonium hydrohalide salts are fully operable to give the simple salts.

In the case of the inorganic simple anion-radical salts because of lower reactivity and increased solubility problems, the metathetical reaction is the method of choice. Thus, for practically all the inorganic simple TCNQide salts, the preferred starting point will involve the preparation of lithium TCNQide, most generally from lithium iodide and TCNQ, followed by the subsequent metathetical interchange between the lithium TCNQide and a suitable soluble source of the desired inorganic cation.

Most of these simple anion-radical salts, including both the organic and inorganic type, are completely ionic. However, the invention is inclusive of a broader scope for these simple anion-radical salts in that it includes compounds of very weak charge-transfer bonding, more properly described as pi complexes, as well as the previously discussed wholly anionic, electrostatically bonded charge-transfer compounds with complete charge transfer. Thus, the invention is also inclusive of the anion-radical salts of the Würster-type involving cation radicals. Depending on the base strength, as previously defined, of the cation moiety and the cation radical, these simple salts will involve full charge transfer, i.e., be anionic, or only partial charge transfer of the pi complex type. Thus, bis(dimethylammonium) bis(dimethylamino)ethylene diiodide with two molar proportions of lithium TCNQide forms the full charge-transfer dianion diradical salt, bis-(dimethylammonium) bis(dimethylamino)ethylene bis-(TCNQide); whereas, 1-dimethylammonium-4-dimethyl-aminobenzene perchlorate, i.e., N,N,N',N'-tetramethyl-p-phenylenediamine monoperchlorate, in metathesis with lithium TCNQide forms the 1/1 tetramethyl-p-phenylenediamine/TCNQ pi complex.

The metathetical reactions will generally be carried out with the lithium TCNQide, or whatever other soluble source of the TCNQ anion-radical is being used, in solution in a suitable solvent, to which solution will be added a solution of a source of the cation involved in the same or other suitable solvent. For organic systems, ethanol or ethanol/acetonitrile mixtures are preferred in practice because of favorable solubility relationships. Lithium TCNQide is soluble in ethanol and many organic salts are soluble in ethanol and acetonitrile. In general, alcohols and alkyl nitriles are operable and in some cases water can be used. In general materials such as ethers (e.g., tetrahydrofuran) or chloroalkanes (e.g., methylene dichloride) are to be avoided here since, although they may be solvents for the organic halide, they are non-solvents (precipitants) for the lithium TCNQide and thus would precipitate it before the desired reaction could occur. Also, they are nonsolvents for the by-product lithium salts and so would precipitate them along with the product even if reaction did occur; this could cause purification and separation problems of serious proportions.

Water or water/alcohol mixtures are preferred for reactions with inorganic salts since here water or preponderantly aqueous systems are virtually the only satisfactory solvent for the inorganic starting material. Here the $TCNQ^-$ salts will often be obtained in a hydrated state, especially with transition metals which have a strong coordinating tendency.

The upper temperature limit is defined by the atmospheric pressure boiling point of the highest boiling solvent if and when a mixture is used (i.e., 100° C. for water, 82° C. for acetonitrile, 78° C. for ethanol). For a single solvent system (at least among the three solvents cited), the normal boiling point of that solvent is the preferred upper limit. If one wishes to operate at higher temperatures (e.g., the above solvents under pressure or higher boiling analogs), one should keep below the melting point of the anticipated product since the likelihood of decompositional side reaction increases at higher temperatures. This is particularly true when using solvolytic solvents so that the nucleophilic displacement of substituent groups is minimized. A practical safe upper limit would be 150° C.

Formation of large crystals is customarily favored by mixing reagents at an elevated temperature and cooling at a slow rate without mechanical mixing, e.g., at a minimum cooling rate of 3° C. per hour, i.e., mix at about 100° C. and then cool to room temperature during the succeeding 24 hours. Holding at the high temperature for too long may allow side reactions to occur to an undesirable extent. Cooling much below room temperature is not especially desirable even in the organic systems, but 5° C. is a practical lower limit. Should microcrystals be desired, reactants should be dissolved singly at the lowest temperature which will give about an 0.1 molar solution, then mixed rapidly with vigorous agitation and rapid cooling. Before mixing, the individual reactant concentration should be between about 0.001 and 0.1 molar.

The second class of these charge-transfer compounds of the TCNQides, i.e., those containing, in addition to the requisite stoichiometric amount of the TCNQ anion-radical to achieve electrical neutrality, additional combined proportions of neutral TCNQ, is in itself divided into two subclasses, both having the generic structural formula:

$$M^{n+}(TCNQ^-)_n(TCNQ°)_m$$

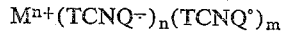

but differing in physical properties. The first and most numerous subclass is characterized by intermediate values of electrical conductivity in the range of 10 ohm-cm. for single crystals, intermediate activation energies for conductivity in the range of about 0.1 ev., again for single crystals, and exhibiting a temperature-dependent paramagnetic susceptibility which corresponds to a weak pairing up of the electrons of the $TCNQ^-$ radicals. The other subclass of this second broad type of the TCNQ ion-radicals has the same general structural formula just given but differs widely in physical properties. These salts have very low electrical resistivities of the order of 0.01 ohm-cm. or even lower and quite low activation energies for conductivity in the range of 0.05 ev. or lower, and, most importantly, differ from the other type of the anion-radical salts containing combined neutral TCNQ in exhibiting a temperature-independent paramagnetism, which property indicates that the electrons in these crystals are degenerate, as in metals or highly doped semiconductors. Most of this last class of the anion-radical/neutral TCNQ salts with such extremely interesting electrical properties are characterized by having a cation moiety which involves a planar aromatic structure, e.g., 2/1 TCNQ/quinolinium, -N-methylquinolinium, -N-propyl-quinolinium, -4-cyano-N-methylquinolinium, -pyridinium, -1-methyl-2-(p-dimethylamino phenylamino)quinolinium, -2,2-dipyridylinium, and -1-methyl-2-(p-dimethylamino-phenylazo)pyrilinium salts. While this quality of the cation containing a planar aromatic structure is obviously a sufficient condition for these high electrical conductivities and allied other interesting properties, it is not a necessary one since salts of the TCNQ anion-radical with other cations exhibit some of these desirable electrical properties, e.g., the 2/1 TCNQ/triethylammonium, -tetraethylammonium, and -diazabicylooctane, which cations are not planar.

This second broad class of the TCNQ anion-radical salts, i.e., those containing the combined neutral TCNQ, will be prepared under temperature and concentration conditions, and in general using the same solvent systems, as already discussed in detail for the simple anion-radical salts. In most instances, these salts involving the combined neutral TCNQ will be more readily obtained with the organic cations. With such cations, this type of salt is normally obtained directly by reaction of the source of the organic cation, e.g., a substituted quaternary ammonium halide, with TCNQ directly. The most useful halides, by virtue of solubility and reactivity considerations, are the iodides. With these, since the by-product of the reaction is iodine, it is generally preferred to use a large excess of the quaternary ammonium iodide reactant so as to permit scavenging of the liberated iodine in the form of the substituted $I_3^-$ anion.

Another general method for the formation of these TCNQ anion-radical salts containing portions of combined neutral TCNQ involves interaction of the source of the cation, in neutral form, with both dihydroTCNQ and TCNQ, for instance, according to the following equation:

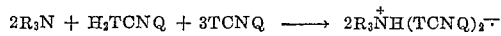

In the case of the inorganic TCNQ anion-radicals containing the combined neutral TCNQ, these products are obtainable most conveniently by iodide discharge from the necessary cation iodide in reaction with TCNQ in organic systems. The complex inorganic cation ion-radical salt with combined neutral TCNQ can also be prepared by the action of TCNQ in organic systems on the preformed simple anion-radical. Simple metathesis of an alkali metal TCNQide in all instances results only in formation of the simple anion-radical salt involving cation exchange. Generally speaking, with the organic cations, the formation of a complex salt containing combined neutral TCNQ will be favored over the simple anion-radical salts and will form in any synthesis system involving neutral TCNQ. Rare instances will occur where the simple anion-radical salt will be favored and in those instances formation thereof can be enhanced by using an excess of the cation precursor. Of course, it is within the purview of the present invention to prepare first simple anion-radical salts and convert these, if desired, to the more complex salt-containing combined neutral TCNQ simply by the addition of the requisite portions of the TCNQ required to a solution of the simple anion-radical charge-transfer salt.

By virtue of their generically deep colors, the single crystals of the TCNQ/Lewis base charge-transfer compounds find utility as the coloring material in marking instruments such as a conventional pencil type wherein the fabricated single crystal serves as the equivalent of the lead. By virtue of the strong broad absorption in the near infrared region, particularly for the most desirable TCNQ/Lewis base charge-transfer compounds which exhibit a detectable paramagnetic resonance absorption, marks made by such marking instruments are readily and easily copied by the desirable cheap thermographic processes. In the larger single-crystal form, the TCNQ/Lewis base charge-transfer compounds, because of their attractive shape and appearance, being colored yet highly reflective on some of the crystal planes, find use as decorative materials, e.g., as the equivalent of gem stones in jewelry, and the like. Similarly, in the smaller single-crystal form, the TCNQ/Lewis base charge-transfer compounds find artistic and decorative utility, for instance, as pearlescent materials in otherwise colorless plastics, or pearlescent pigment materials for decorative laquers and plastic solutions.

The present invention is likewise generic to the charge-transfer compounds of the alkyl-substituted 7,7,8,8-tetracyanoquinodimethans with Lewis bases broadly. More specifically, the invention is generic to the charge- transfer compounds of the alkyl-substituted 7,7,8,8-tetracyanoquinodimethans with the Lewis bases discussed broadly and specifically in the foregoing columns 2–6 as applied to TCNQ itself. The following detailed exemplary disclosures are submitted to fully illustrate but not to limit the alkylTCNQ/Lewis base charge-transfer compound aspect of the present invention. These charge-transfer compounds of the alkyl-substituted TCNQ's with Lewis bases find generic and specific utility in the same outlets described in detail in the foregoing column 15 and column 41 for the charge-transfer compounds of TCNQ itself.

EXAMPLE LXIV

To a hot (about 70° C.) solution of 0.36 part of MeTCNQ in 9.4 parts of acetonitrile was added a solution of 0.79 part of methyltriphenylarsonium (MeTPAs) iodide in 5.5 parts of acetonitrile. The reaction mixture immediately turned dark blue-green and was heated briefly (about 70° C.) and then allowed to stand at room temperature under nitrogen. The volume of the reaction mixture was then reduced to that corresponding to ten parts of water under a stream of nitrogen at room temperature and the resulting solid removed by filtration. After drying, there was thus obtained 0.35 part (56% of theory) of the 2/1 MeTCNQ/MeTPAs charge transfer compound as small, blue-black, rod-like crystals melting at 171–173° C.

*Analysis.*—Calcd. for $C_{45}H_{30}N_8As$: C, 71.5%; H, 4.0%; N, 14.8%; As, 9.9%. Found: C, 70.3%; H, 4.4%; N, 13.7%; As, 10.3%.

In a substantially identical manner there was obtained from 0.22 part of MeTCNQ in 5.5 parts of acetonitrile and 0.41 part of methyltriphenylphosphonium iodide (MeTPPI) in four parts of acetonitrile, 0.25 part (71% of theory) of the 2/1 MeTCNQ/MeTPP charge-transfer compound as small, blue-black, rod-like crystals melting at 180–182° C.

*Analysis.*—Calcd. for $C_{45}H_{30}N_8P$: C, 75.7%; H, 4.2%; N, 15.7%; P, 4.3%. Found: C, 75.5%; H, 4.1%; N, 14.6%; P, 4.4%.

In a substantially identical manner from 0.440 part of MeTCNQ in 7.8 parts of acetonitrile and 0.46 part of triethyl ammonium iodide (TEAI) in 5.5 parts of acetonitrile there was obtained 0.22 part (40% of theory) of the 2/1 MeTCNQ/TEA charge-transfer compound as a dark blue, fluffy solid melting at 173–176° C.

*Analysis.*—Calcd. for $C_{35}H_{28}N_9$: C, 71.4%; H, 5.2%; N, 23.5%. Found: C, 70.8%; H, 5.3%; N, 22.2%.

In a substantially identical manner from 0.22 part of MeTCNQ in 5.5 parts of acetonitrile and 0.16 part of sodium iodide in four parts of acetonitrile there was obtained 0.17 part (70% of theory) of the 1/1 MeTCNQ/ sodium charge-transfer compound as blue-purple microcrystals not melting up to 400° C.

*Analysis.*—Calcd. for $C_{13}H_6N_4Na$: C, 64.8%; H, 2.5%; N, 23.2%; Na, 9.6%. Found: C, 64.5%; H, 2.7%; N, 21.8%; Na, 8.7%.

EXAMPLE LXV

A solution of 7.0 parts of lithium iodide in 31 parts of boiling acetonitrile was added to a solution of 3.92 parts of crude 2-methylTCNQ in 75 parts of boiling acetonitrile, and the mixture was allowed to cool to room temperature. The resultant purple-black solid was removed by filtration and dried. There was thus obtained 2.1 parts (51% of theory) of lithium 2-methylTCNQide as a purple-black solid, which was further purified by dissolving in hot acetone and precipitating with diethyl ether to form a light blue powder.

*Analysis.*—Calcd. for $C_{13}H_6N_4Li$: C, 69.4%; H, 2.7%; N, 24.9%. Found: C, 69.2%; H, 3.1%; N, 25.0%.

To a boiling solution of 0.45 part of the above lithium 2-methylTCNQide in 40 parts of absolute alcohol was added a boiling solution of 0.61 part of N-methylphenazinium methylsulfate in 16 parts of alcohol. After cooling to room temperature, filtering and drying, there was thus obtained 0.6 part of crude 1/1 methylTCNQ/N-methylphenazinium charge-transfer compound. On recrystallization from acetonitrile, the product was obtained as purple plates (volume resistivity, $3\times10^6$).

*Analysis.*—Calcd. for $C_{26}H_{17}N_6$: C, 75.5%; H, 4.2%; N, 20.3%. Found: C, 75.2%; H, 4.4%; N, 20.4%.

EXAMPLE LXVI

To a solution of 1.31 parts of n-PrTCNQ in 9.35 parts of methylene chloride and 7.8 parts of acetonitrile was added a solution of 0.48 part of sodium iodide in 7.8 parts of acetonitrile. The mixture immediately turned green and a blue solid began to precipitate. The mixture was allowed to stand overnight at room temperature and the blue solid was then removed by filtration under nitrogen. After repeated washing with carbon tetrachloride, there was obtained 0.87 part (63% of theory) of crude sodium n-PrTCNQide as a purple-blue solid which did not melt below 400° C.

*Analysis.*—Calcd. for $C_{15}H_{10}N_4Na$: Na, 8.5%. Found: Na, 7.9%.

The following additional charge-transfer compounds of the present invention are submitted as more fully illustrative of the previously referred to complex anion-radical salts wherein the combined anion-radical and neutral moieties of the complex anion-radical salt comprise different species.

EXAMPLE LXVII

A solution of 1.0 part of TCNQ and 1.08 parts of MeTCNQ in about 120 parts of pure acetonitrile was reduced in volume under nitrogen to approximately two-thirds its initial volume, and a solution of 4.48 parts of methyl triphenylarsonium iodide in about 30 parts of acetonitrile was added. The resultant hot mixture was stored in a Dewar flask 24 hours and the resultant solid removed by filtration and dried. There was thus obtained 2.05 parts (55% of theory) of the methyltriphenylarsonium (TCNQ/MeTCNQ) complex anion radical/neutral salt as black rosettes melting at 198–200° C. with decomposition.

*Analysis.*—Calcd. for $C_{44}H_{28}N_8As$: C, 71.1%; H, 3.8%; N, 15.1%; As, 10.1%. Found: C, 71.1%; H, 4.0%; N, 15.0%; As, 10.4%.

In contrast to this mixed anion-radical/neutral salt, the 2/1 TCNQ/methyltriphenylarsonium complex anion-radical/neutral salt is obtained as characteristic triclinic prisms melting at 224–227° C. with decomposition and the 2/1 MeTCNQ/methyltriphenylarsonium complex anion-radical/neutral salt melts at 180° C. Furthermore, a physical mixture of the latter two species melts at 181° C. with decomposition. In contrast to these markedly different physical properties, the electrical properties of the mixed compound are not markedly different from the 2/1 type complex. Thus, the volume resistivity along the longest crystal axis of the methyltriphenylarsonium/(TCNQ, MeTCNQ)⁻ was found to be 44 ohm-cm. corresponding to a value of 57 ohm-cm. for the 2/1 TCNQ/methyltriphenylarsonium charge-transfer compound.

To a hot solution of 1.02 parts of TCNQ and 1.08 parts of MeTCNQ in about 85 parts of acetonitrile was added 4.04 parts of methyltriphenylphosphonium iodide in about 30 parts of acetonitrile and the resultant hot mixture was placed in a Dewar flask and allowed to stand under nitrogen at room temperature for 48 hours. The solid was removed by filtration and dried, thereby affording 1.40 parts (40% of theory) of the methyltriphenylphosphonium/(TCNQ, MeTCNQ)⁻ complex anion-radical salt as small, black crystals melting at 204–208° C. with decomposition.

*Analysis.*—Calcd. for $C_{44}H_{28}N_8P$: C, 75.5%; H, 4.0%; N, 16.0%; P, 4.4%. Found: C, 75.7%; H, 4.0%; N, 15.7%; P, 4.3%.

The melting point of the mixed methyltriphenylphosphonium/(TCNQ, MeTCNQ)⁻ complex anion-radical salt is intermediate between that of the 2/1 TCNQ/methyltriphenylphosphonium complex anion-radical salt (224–227° C. with decomposition) and that of the 2/1 MeTCNQ/methyltriphenylphosphonium anion-radical salt (182° C. with decomposition); whereas, a physical mixture of the latter 2/1 complexes melts at 185° C. with decomposition.

EXAMPLE LXVIII

To a boiling solution of 2.6 parts of 2,5-dimethyl-TCNQ in 136 parts of acetonitrile was added a boiling solution of 4.5 parts of lithium iodide in 16 parts of acetonitrile. The mixture was allowed to cool to room temperature, and the purple, microcrystalline product was removed by filtration and dried. There was thus obtained 2.4 parts of the simple 1/1 lithium/2,5-dimethyl-TCNQide salt.

*Analysis.*—Calcd. for $C_{14}H_8N_4Li$: C, 70.4%; H, 3.4%; N, 23.4%. Found: C, 67.0%; H, 3.9%; N, 22.0%.

EXAMPLE LXIX

To a hot filtered solution of 0.48 part of the above lithium/2,5-dimethylTCNQide in 39 parts of absolute ethyl alcohol was added a hot solution of 0.61 part of N-methylphenazinium methylsulfate in 16 parts of absolute ethyl alcohol. After allowing the solution to cool to room temperature, the gray-blue solid was removed by filtration and recrystallized from 94 parts of acetonitrile. There was thus obtained 0.52 part of the simple 1/1 N-methylphenazinium/2,5-dimethylTCNQide salt as a gray-blue solid melting with decomposition at 170–172° C. and exhibiting a volume resistivity of 18 ohm-cm.

*Analysis.*—Calcd. for $C_{27}H_{19}N_6$: C, 75.9%; H, 4.5%; N, 19.6%. Found: C, 75.2%; H, 4.6%; N, 19.2%.

EXAMPLE LXX

To a boiling solution of 0.43 part of 2-methylTCNQ in 7.8 parts of acetonitrile was added a boiling solution of 0.4 part of N-methylquinolinium iodide in 7.8 parts of acetonitrile. The mixture was allowed to stand at room temperature for two hours, and the purple needle product was removed by filtration and washed on the filter with cold acetonitrile and diethyl ether. There was thus obtained 0.24 part of crude complex 1/2 N-methylquinolinium/(2-methylTCNQ)⁻(2-methylTCNQ)° salt exhibiting a volume resistivity of 44 ohm-cm.

*Analysis.*—Calcd. for $C_{36}H_{22}N_9$: C, 74.4%; H, 3.8%; N, 21.7%. Found: C, 75.0%; H, 4.3%; N, 19.5%.

In addition to the previously described simple charge-transfer compounds of TCNQ and the C-alkyl substituted TCNQ derivatives and the complex charge-transfer compounds containing one or more combined cation species and one or more combined neutral and anion radical forms of TCNQ and the C-alkyl substituted TCNQ derivatives, the present invention is also generic to still more complex salts wherein there are present a cation species and a TCNQ or C-alkyl substituted TCNQ anion-radical species, as well as a combined neutral base moiety and a combined neutral TCNQ or C-alkyl substituted TCNQ moiety. Generally speaking, as in the case of the 1/2 cation/(TCNQ⁻)/(TCNQ°) salts, the combined anion radical and combined neutral TCNQ moiety will be the same. However, this is not necessarily true, and, similarly, it does not apply to the necessary identity in type between the combined base cation and the combined neutral base moiety in the four-component complex salts of the type (cation⁺)/(base°)/(TCNQ⁻)/(RTCNQ°) where the cation moiety is different in fundamental structure from the combined (base°) moiety, i.e., (cation⁺)≠(base°)+e. These four-component complex charge-transfer salts, i.e., those containing both a combined neutral base moiety and a combined neutral TCNQ or C-alkyl substituted TCNQ moiety, are generically characterized by extremely low volume resistivities. They can be prepared in several ways, for instance, by using large stoichiometric excesses of the base species in reaction with a mixture of TCNQ and H₂TCNQ, or by recrystallization of a preformed three-component charge-transfer complex salt of the type (cation⁺)/(TCNQ⁻)/(TCNQ°) in the presence of stoichiometric quantities of the base corresponding to the (cation⁺) moiety or another base.

The following examples illustrate in part the formation and characterization of said four-component complex salts. They also illustrate several other techniques of use in preparing the three-component TCNQ charge-transfer complex salts of the type (cation⁺)/(TCNQ⁻)/(TCNQ°), for instance, by first reacting TCNQ or the desired C-alkyl substituted TCNQ with hydroquinone followed by a reaction of the thus-formed 1/1 TCNQ/hydroquinone complex with the requisite base, or by direct synthesis of the three-component complex charge-transfer salts by impact grinding between the requisite base and the desired TCNQ or C-alkyl substituted TCNQ's, or by first reacting the desired base component with hydroquinone to form the 2/1 base/hydroquinone complex and subsequently reacting this 2/1 base/hydroquinone salt with the desired TCNQ or C-alkyl substituted TCNQ moiety, or by formation of a 1/1 H₂TCNQ/TCNQ complex by direct impact grinding of the two species followed by subsequent reaction of the thus-formed 1/1 complex with the requisite base in the presence of additional TCNQ or C-alkyl substituted TCNQ's.

EXAMPLE LXXI

In about 120 parts of boiling acetonitrile was dissolved two parts of TCNQ and 0.66 part of H₂TCNQ. To the resultant hot solution was added a solution of 5.2 parts (a three molar excess proportion) of 3-bromoquinoline in about 19.5 parts of acetonitrile, and the resultant mixture was allowed to stand for two hours at room temperature. The resultant blue-black needle product was removed by filtration and washed on the filter with about 40-part portions each of acetonitrile, dichloromethane, and diethyl ether. After drying, there was thus obtained 4.6 parts of (3-bromoquinolinium⁺)/(3-bromoquinoline°)/(TCNQ)⁻(TCNQ)° complex salt as blue-black needles exhibiting a volume resistivity of 0.5 ohm-cm.

*Analysis.*—Calcd. for $C_{33}H_{15}N_9Br$: Br, 19.4%. Found: Br, 19.3%.

The preceding preparation was repeated substituting five parts of 8-methylquinoline for the 3-bromoquinoline. There was thus obtained 2.8 parts of the (8-methylquinolinium⁺)/(8 - methylquinoline°)/(TCNQ)⁻/(TCNQ)° complex salt as blue-black crystals exhibiting a volume resistivity of 3.3 ohm-cm. Polarographic analysis of the product showed the presence of 9 mole percent of the amine moiety as a cation, 29 mole percent of the associated neutral amine moiety, 24 mole percent of combined (TCNQ°), and 39 mole percent of combined (TCNQ⁻).

The preceding preparation was repeated substituting five parts of 6-methylquinoline for the 8-methylquinoline. There was thus obtained four parts of (6-methylquinolinium⁺)/(6 - methylquinoline°)/(TCNQ)⁻/(TCNQ°) complex salt as blue-black crystals exhibiting a volume resistivity of 5.3 ohm-cm. Polarographic analysis showed the presence of 22 mole percent of amine combined as a cation, 16 mole percent of the associated neutral amine, 33 mole percent of the combined (TCNQ°), and 29 mole percent of combined (TCNQ⁻).

The preceding preparation was repeated substituting five parts of 7-methylquinoline for the five parts of 6-methylquinoline. There was thus obtained 3.8 parts of (7 - methylquinolinium⁺)/(7 - methylquinoline°)/(TCNQ)⁻/(TCNQ)° complex salt as blue-black crystals exhibiting a volume resistivity of 5.7 ohm-cm. Polarographic analysis indicated the presence of 35 mole percent of combined amine as cation, 7 mole percent of associated neutral amine, 33 mole percent of (TCNQ°), and 26 mole percent of (TCNQ⁻).

The preceding preparation was repeated substituting 12.9 parts of isoquinoline for the five parts of 7-methylquinoline. There was thus obtained 3.8 parts of (isoquinolinium⁺)/(isoquinoline°)/(TCNQ)⁻/(TCNQ)° complex salt as blue-black crystals exhibiting a volume resistivity of 2.2 ohm-cm. Polarographic analysis showed the presence of 7 mole percent of combined amine as a cation species, 29 mole percent of associated neutral amine, 24 mole percent of (TCNQ°), and 39 mole percent of (TCNQ⁻).

The preceding preparation was repeated substituting 3.2 parts of pyridine for the 12.9 parts of isoquinoline. There was thus obtained 0.9 part of (pyridinium⁺)/(pyridine°)/(TCNQ)⁻/(TCNQ)° complex salt as blue-black crystals exhibiting a volume resistivity of 123.1 ohm-cm. Polarographic analysis indicated the presence of 16 mole percent of combined amine as cation species, 27 mole percent of associated neutral amine, 16 mole percent of combined (TCNQ°), and 41 mole percent of (TCNQ⁻).

EXAMPLE LXXII

Impact grinding of H₂TCNQ with TCNQ in a commercially available, high-speed, impact grinder afforded a green solid which apparently is a complex and exhibits a volume resistivity of $3.4 \times 10^8$ ohm-cm.

To a boiling solution of 3.6 parts of TCNQ and 3.6 parts of the above H₂TCNQ/TCNQ complex in about 392 parts of acetonitrile was added a solution of 2.24 parts of quinoline in 19.5 parts of acetonitrile. The mixture was allowed to stand at room temperature for two hours, and the blue-black needle product was removed by filtration and washed on the filter with about 40 parts each of acetonitrile, dichloromethane, and diethyl ether. After drying, there was thus obtained 7.7 parts of the complex (quinolinium⁺)/(TCNQ)⁻/(TCNQ)° salt. The structure was checked by infrared analysis.

EXAMPLE LXXIII

A solution of 13 parts of quinoline in about 35 parts of a 1/1 by volume mixture of diethyl ether/petroleum ether was added to about 375 parts of a saturated solution of hydroquinone in a 1/1 by volume diethyl ether/petroleum ether mixture. On standing at room temperature, a white solid product formed which was removed by filtration and dried. There was thus obtained seven parts of the (quinoline)₂/(hydroquinone)₁ complex as white crystals melting at 104–105° C. and exhibiting a volume resistivity of $2.7 \times 10^{14}$ ohm-cm. The product can be purified by sublimation or by recrystallization from benzene.

A solution of one part of the above (quinoline)$_2$/(hydroquinone)$_1$ complex in about 22 parts of acetonitrile was added at once to a boiling solution of two parts of TCNQ in about 120 parts of acetonitrile. The resulting mixture was allowed to stand for two hours at room temperature, and the blue-black matted needle product was removed by filtration and washed on the filter with about 40 parts each of acetonitrile, dichloromethane, and diethyl ether. There was thus obtained 1.9 parts of the complex (quinolinium⁺)/(TCNQ)⁻/(TCNQ)° charge-transfer compound exhibiting a volume resistivity, as obtained by the two-probe technique on a powder compaction thereof, of 1.75 ohm-cm.

EXAMPLE LXXIV

A mixture of 5.1 parts of TCNQ and 6.8 parts of N-methylquinolinium iodide was placed in a steel vial containing two steel balls. The vial was closed and put in a commercially available, high-speed, impact grinder (the Spex Mixer Mill), and the vial was shaken vigorously therein for one hour. The vial was opened and the resulting black product removed. This exhibited a volume resistivity of 62.8 ohm-cm. and was identified as the complex (N-methylquinolinium⁺)/(TCNQ)⁻/(TCNQ)° charge-transfer compound by its infrared spectrum.

In similar fashion, the complex (triethylammonium⁺)/(TCNQ)⁻/(TCNQ)° charge-transfer compound was obtained from triethylammonium iodide as was also the complex (tetrabutylammonium⁺)/(TCNQ)⁻/(TCNQ)° salt from the corresponding tetrabutyl derivative. This latter charge-transfer complex salt is notably difficult to isolate by solution techniques but is achieved readily and directly by the impact grinding technique.

EXAMPLE LXXV

Impact grinding as described in the preceding example of a mixture of TCNQ and hydroquinone afforded a 1/1 complex of TCNQ/hydroquinone as a dark green solid exhibiting a volume resistivity of $1.0 \times 10^8$ ohm-cm. A solution of 1.6 parts of the above 1/1 TCNQ/hydroquinone complex in about 58.5 parts of acetonitrile and a solution of 1.29 parts of quinoline in about 19.5 parts of acetonitrile were added to a boiling solution of three parts of TCNQ in 117 parts of acetonitrile. The resultant mixture was allowed to stand for two hours at room temperature, and the blue-black matted needle product was removed by filtration and washed on the filter with about 40 parts each of acetonitrile, dichloromethane, and diethyl ether. There was thus obtained 3.9 parts of the complex (quinolinium⁺)/(TCNQ)⁻/(TCNQ)° charge-transfer compound exhibiting a volume resistivity on a powder compaction thereof by the two-probe technique of 2.6 ohm-cm. The complex structure of the product was checked by infrared analysis.

EXAMPLE LXXVI

A solution was prepared by dissolving two parts of the complex (quinolinium⁺)/(TCNQ)⁻/(TCNQ)° salt and five parts of 3-bromoquinoline in 49.5 parts of hot anisole. The solution was allowed to stand at room temperature for two hours. The black, crystalline product was removed by filtration and dried, and there was thus obtained 1.3 parts of a mixture of the starting (quinolinium⁺)/(TCNQ)⁻/(TCNQ)° and the more complex (quinolinium⁺)/(3-bromoquinoline°)/(TCNQ)⁻/(TCNQ)° possibly mixed with some of the (3-bromoquinolinium⁺)/(TCNQ)⁻(TCNQ)° complex salt. The product exhibited a different crystal habit from that of the starting (quinolinium⁺)/(TCNQ)⁻/(TCNQ)° and exhibited an electrical resistivity of 21.8 ohm-cm.

*Analysis.*—Calcd. for (quinolinium⁺)/(TCNQ)⁻/(TCNQ)°: Br, 0.0%; (quinolinium⁺)/(3-bromoquinoline°)/(TCNQ)⁻/(TCNQ)°: Br, 10.5%; (3-bromoquinolinium⁺)/(TCNQ)⁻(TCNQ)°: Br, 13.0%. Found: Br, 8.0%.

The foregoing preparation was repeated with various other organic bases substituted for the 3-bromoquinoline, using in all instances the complex (quinolinium⁺)/(TCNQ)⁻/(TCNQ)° salt, with the following results:

| Organic Base | Electrical Resistivity (Ohm-cm.) |
|---|---|
| None) (control (quinolinium⁺)/(TCNQ)⁻/(TCNQ)° | 4.7 |
| 2-Bromopyridine | 49.8 |
| 2-Chloropyridine | 9.0 |
| Acetyldiethylamine | 3.4 |
| Pyridine | 12.7 |

Similar preparations were carried out substituting (N-methylquinolinium⁺)/(TCNQ)⁻/(TCNQ)° for the previously described quinolinium complex with the indicated different organic bases—the results of which experiments are shown in the following table:

| Organic Base | Electrical Resistivity (Ohm-cm.) |
|---|---|
| None (control) (N-methylquinolinium⁺)/(TCNQ)⁻/(TCNQ)° | 32.8 |
| 3-Bromoquinoline | 331.3 |
| 2-Chloropyridine | 83.3 |
| 2-Bromopyridine | 21.8 |
| Tri-n-butylamine | $8.2-10^8$ |

Similar preparations were carried out, as outlined in the foregoing, with the complex (triethylammonium⁺)/(TCNQ)⁻/(TCNQ)° salt as the starting complex salt with varying organic bases—the results of which interchanges are given in the following table:

| Organic Base | Electrical Resistivity (Ohm-cm.) |
|---|---|
| None (control) (triethylammonium⁺)/(TCNQ)⁻/(TCNQ)° | 458 |
| 2-Chloropyridine | 266 |
| 2-Bromopyridine | 1,115 |
| Quinoline | 31.5 |
| Pyridine | 85 |

In addition to the foregoing Lewis bases illustrated by genus, subgenus, and specific type, as well as by the many detailed examples, other Lewis bases well known in the art as such can also be used with the tetracyanoquinodimethan and the C-alkyl substituted tetracyanoquinodimethans to form the new charge-transfer compounds of the present invention, including both the simple 1/1 charge-transfer compounds as well as the complex charge-transfer compounds containing combined neutral tetracyanoquinodimethan and C-alkyl substituted tetracyanoquinodimethan moieties and/or combined neutral Lewis base moieties. Included in these additional, operable, known Lewis bases, in addition to those previously listed, are: such additional amines as alkyl amines, e.g., dimethylamine, trimethylamine, diethylamine, triethylamine, n-butylamine, tri-n-butylamine, butylethylmethylamine, n-eicosylamine, di-n-eicosylamine, tri-n-eicosylamine, and their N-alkyl quaternary salts with conventional anions, e.g., the halides such as iodides, chlorides, and bromides; dimethylphosphine, trimethylphosphine, diethylphosphine, triethylphosphine, n-butylphosphine, tri-n-butylphosphine, butylethylmethylphosphine, n-eicosylphosphine, di-n-eicosylphosphine, and tri-n-eicosylphosphine and their N-alkyl quaternary salts with conventional anions, e.g., the halides such as iodides, chlorides, and bromides; dimethylarsine, trimethylarsine, diethylarsine, triethylarsine, n-butylarsine, tri-n-butylarsine, butylethylmethylarsine, n-eicosylarsine, di-n-eicosylarsine, and tri-n-eicosylarsine and their N-alkyl quaternary salts with conventional anions, e.g., the halides such as iodides, chlorides, and bromides; dimethylstibine, trimethylstibine, diethylstibine, triethylstibine, n-butylstibine, tri-n-butylstibine, butylethylmethylstibine, n-eicosylstibine, d-n-eicosylstibine, and tri-n-eicosylstibine and their N-alkyl quaternary salts with conventional anions, e.g., the halides such as iodides, chlorides, and bromides; aromatic amines, e.g. 1-naphthylamine, 2-naphthylamine, 1,2-diaminonaphthalene, 1,3-diaminonaphthalene, 1,4-diaminonaphthalene, 1,5-diaminonaphthalene, 1,6-diaminonaphthalene, 1,7-diaminonaphthalene, aniline, o-phenylenediamine, m-phenylenediamine, p-phenylenediamine, o-toluidine, m-toluidine, p-toluidine, xylamine, o-anisidine, m-anisidine, p-anisidine, 2-aminopyridine, 3-aminopyridine, 2-methoxypyridine, 3-methoxypyridine, 4-methoxypyridine, 1-aminoquinoline, 2-aminoquinoline, 3-aminoquinoline, 4-aminoquinoline, 5-aminoquinoline, 6-aminoquinoline, 7-aminoquinoline, 8-aminoquinoline and the N-alkyl, e.g., N-monomethyl, N-monoethyl, and N,N-dimethyl, N,N-diethyl derivatives, 2-aminobiphenyl, 3-aminobiphenyl, 4-aminobiphenyl and the N-methyl and N,N-dimethyl derivatives, benzidine and the N-alkyl derivatives thereof, e.g., N-methylbenzidine, N,N - dimethylbenzidine, N,N'-dimethylbenzidine, N,N,N' - trimethylbenzidine, and N,N-N',N'-tetramethylbenzidine; O-tolidine, m-tolidine, and the N-alkyl, e.g., N-methyl, derivatives analogous to those just described for benzidine, and acridine and their N-alkyl quaternary salts with conventional anions, e.g., the halides such as iodides, chlorides, and bromides; aromatic hydroxy compounds, e.g., phenols and substituted phenols, and their hydrocarbyl, particularly alkyl, ether derivatives such as catechol, resorcinol, and hydroquinone, and their mono- and dimethyl and -ethyl ethers, and phloroglucinol; other aromatic compounds, including both wholly hydrocarbon mono- and polycyclic as well as heteroatom-substituted aromatic mono- and polycyclic structures, such as phenothiazine, fluorene, carbazole, dibenzofuran, dibenzothiophene, phenazine and their 1-, 2-, 3-, 4-, 5-, 6-, 7-, and 8-amino-, 1-, 2-, 3-, 4-, 5-, 6-, 7-, and 8-hydroxy-, and 1-, 2-, 3-, 4-, 5-, 6-, 7-, and 8-alkoxy, e.g., methoxy, derivatives and also the dimethylamino derivatives; phenanthrene, anthracene, tetracene, pentacene, 1,2 - benzanthracene, 1,2,3,4 - dibenzanthracene, 1,2,5,6 - dibenzanthracene, 1,2,7,8-dibenzanthracene, 1,2-benztetracene, 9,10-dimethyl-1,2,5,6-dibenzanthracene, perylene, pyrene, durene, and pentamethylbenzene; and such other amino-containing functionally substituted Lewis bases as 4-aminoazobenzene, aminobenzimidazole, aminobenzotriazole, glycine, methionine, pyroline, trypophane, tyrosine, glutathione, cytosine, adenine, guanine, triazine, tetrazine, tryamine, adrenaline, mescaline, nicotine, cuskhygrine, coninine, lobeline, atropine, scopolamine, codeine, morphine, lupinine, cinchronine, and quinine.

As stated in the foregoing, the present invention is generic to the charge-transfer compounds of TCNQ and the C-hydrocarbyl substituted TCNQ's with Lewis bases. These charge-transfer compounds vary in structure and properties, primarily as a function of the relative base strengths of the Lewis bases involved, and accordingly include those compounds which are probably more properly referred to as complexes wherein in the equilibrium stable state there is no detectable charge transfer between the Lewis acid component, i.e., the TCNQ or C-hydrocarbyl substituted TCNQ's, and the Lewis base component. These materials are believed to be properly describable as pi complexes involving semibonding atomic orbital overlap between the pi orbitals of the Lewis acid and Lewis base components.

The more important charge-transfer compounds of TCNQ and the C-hydrocarbyl substitued TCNQ's are the charge-transfer compounds wherein in the ground equilibrium state there exists a formalized charge transfer between the Lewis acid and Lewis base components. In these compounds, an electron has been donated by the Lewis base component and accepted by the Lewis acid component, i.e., the TCNQ or C-hydrocarbyl substituted TCNQ component, and accordingly in the equilibrium representation of the ground state of such compounds, the TCNQ or C-hydrocarbyl substituted TCNQ component exists on an equilibrium basis in the form of the corresponding anion radical of TCNQide, i.e., TCNQ$^{\div}$. Depending on the base strength of the Lewis acid components in these charge-transfer compounds, there are two normal types of such compounds. The first of these are those with the moderately strong Lewis bases, which are best describable as the simple anion-radical salts, wherein, on a stoichiometric basis to attain equilibrium electronic neutrality, the over-all molecular structure of the said compounds will consist of the cation involved (or cations in the case of mixed salts) and the TCNQide or C-hydrocarbyl substituted TCNQides in amount such as to give over-all electronic neutrality.

The second of these are the complex anion-radical salts wherein, in addition to the requisite numbers of the TCNQ and C-hydrocarbyl substituted TCNQ anion radicals to assure over-all electronic neutrality, there are also present one or more normally molar but not necessarily unitarily molar, on a stoichiometric basis, proportions of bound or combined TCNQ or C-hydrocarbyl substituted TCNQ moieties, alike or different, and/or one or more, again generally molar but not necessarily unitarily so, bound or combined species of base moieties, alike or different, both of which such additional moieties, while bound into the molecular structure of the said complex anion-radical salt, are still electronically neutral as contrasted to the just described necessary electronically balancing anion radicals. While it is not known with any certainty, it is believed that the anion-radical TCNQide and C-hydrocarbyl substituted TCNQide moieties are bound into the over-all molecular structure of the complex anion-radical salts by formal electronic equilibrium bondings to the cation, and that the bound or combined neutral moieties are bound into the over-all molecular structure of the complex anion-radical salts through pi orbital overlaps of the said neutral moieties with the said anion-radical moieties.

Probably the most interesting physical properties of these new materials are to be found in the electrical behavior thereof. The just described pi complexes exhibit the high electrical resistivities in the range which would permit proper classification of these compounds as electrical insulators or non-conductors. The simple anion-radical salts, on the other hand, exhibit moderate electrical resistivity or, viewed from the opposite, moderate electrical conductivity, such as to permit classing many of these materials in the presently recognized important grouping of semiconductors. The most interesting of these materials by several factors are the complex anion-radical salts which exhibit as a class the lowest electrical resistivity, or conversely the highest electrical conductivity, yet exhibited by any wholly organic or mostly organic material. The electrical resistivity of the most outstanding of these complex anion-radical salts permits classification of these materials as conductors and even high-resistivity-metal-like compounds. In addition to this surprising electrical behavior, these complex anion-radical salts are still further outstanding in that in single-crystal form they exhibit anisotropicity of electrical conductivity, or conversely that the electrical resistivity is anisotropic. In the three dimensions of the single-crystal form, there is one axis of major resistivity generally in the semiconductor range, one axis perpendicular thereto of moderate to good conductivity in the conductor range, and a third axis perpendicular to the others of good conductivity up to high resistivity metals ranging as low as a few hundredths of an ohm-cm.$^{-1}$. While it is not known with certainty, indications are that this third axis of high metal resistivity corresponds to the axis perpendicular to the stacking planes of the neutral and anion-radical TCNQ and C-hydrocarbyl substituted TCNQ moieties—both of which are substantially planar and are believed to be present as substantially vertically stacked planar layers in one axis of the molecular structure of the complex anion-radical salts.

The various electrical resistivities of the compounds of the foregoing examples are given in the following two tables, the first of which lists such properties for the compounds described in the table in columns 13–14 by corresponding numbered entry therein, and the second of which lists such properties for the compounds of the additional examples with corresponding numbered reference thereto.

TABLE A

| Expt. No. | Resistivity Ohm-cm. | Expt. No. | Resistivity Ohm-cm. |
|---|---|---|---|
| 1 | 159. | 19 | $2.9 \times 10^3$. |
| 2 | 55. | 20 | $2.7 \times 10^7$. |
| 3 | 110–176. | 22 | $5.3 \times 10^{10}$. |
| 4 | 174, 280. | 23 | 27. |
| 5 | $1.7 \times 10^9$. | 26 | $2.5 \times 10^{11}$. |
| 6 | $1.6 \times 10^4$. | 27 | $2.0 \times 10^{12}$. |
| 7 | $5.0 \times 10^4$. | 28 | $9.0 \times 10^8$. |
| 8 | $3.1 \times 10^5$. | 29 | 0.5. |
| 9 | $1.0 \times 10^7$. | 30 | $5.1 \times 10^6$. |
| 10 | $6.8 \times 10^9$. | 31 | 31. |
| 11 | $2.1 \times 10^3$. | 32 | 11. |
| 12 | $2.7 \times 10^{10}$. | 33 | $1.3–3.0 \times 10^3$. |
| 13 | $1.2 \times 10^4$. | 34 | $2.4 \times 10^4$. |
| 14 | 280. | 35 | $3.2 \times 10^4$. |
| 15 | $2.8 \times 10^{12}$. | 36 | $5.6 \times 10^4$. |
| 16 | $2.3 \times 10^6$. | 37 | $1.2 \times 10^4$. |
| 17 | $9.9 \times 10^3$. | 38 | 0.24–11. |
| 18 | $8.3 \times 10^5$. | | |

TABLE B

| Example | Identity | Resistivity, Ohm-cm. |
|---|---|---|
| I | TCNQ, MeTCNQ, KTCNQ powder | 8.4. |
| II | 2/1 TCNQ/DAD$^+$ needles | 14. |
| III | 1/1 TCNQ/(HO)$_2$ Quin. powder | $6.3 \times 10^3$. |
| IV | 1/1 TCNQ/DAD$^+$ platelets | 0.5. |
| V | 2/1 TCNQ/Et$_3$N$^+$ S.C. | $5.5 \times 10^3$. |
| VI | 2/1 TCNQ/Et$_3$MeN$^+$ S.C. | 8.6. |
| VII | 2/1 TCNQ/Me$_3$$^\circ$ BuN$^+$ S.C. | 60–10$^5$. |
| VIII | 2/1 TCNQ/Me$\varphi_3$P$^+$ S.C. | 10–10$^3$. |
| IX | 2/1 TCNQ/Et$\varphi_3$P$^+$ S.C. | 10$^3$–10$^5$. |
| X | 2/1 TCNQ/$\varphi_4$P$^+$ S.C. | 57–10$^5$. |
| XI | 2/1 TCNQ/Me$\varphi_3$As$^+$ S.C. | 10$^2$–10$^4$. |
| XII | 2/1 TCNQ/Me$_3\varphi$N$^+$ S.C. | 2–10$^4$. |
| XIII | 2/1 TCNQ/Et$\varphi_3$As$^+$ S.C. | 13–10$^4$. |
| XIV | 2/1 TCNQ/$\varphi_4$Sb$^+$ S.C. | 1.6 (109). |
| XV | 2/1 TCNQ/(MeS)$_2$Mo$_2$$^{+2}$ Et needles | 416. |
| XV-A | 2/1 TCNQ/$\varphi_3$Se$^+$ prisms | 10$^6$. |
| XVI | 1/1 TCNQ/Morph.$^+$ S.C. | 10$^3$. |
| XVII | 3/2 TCNQ/Morph.$^+$ S.C. | 10$^6$. |
| XVIII | 1/1 TCNQ/Pyr.$^+$ prisms | 37. |
| XIX | 2/1 TCNQ/Pyr.$^+$ needles | 0.05–1.9. |
| XX | 2/1 TCNQ/Quin.$^+$ needles | 0.05–1.9. |
| XXI | 2/1 TCNQ/Quin.$^+$ needles | 1. |
| XXII | 2/1 TCNQ/$\varphi_3$S$^+$ S.C. | 120, 1.4 $\times 10^5$. |
| XXIII | 4/1/1 (Me$\varphi_3$)$_2$P$^+$As$^+$ S.C. | |
| XXIV | 2/1 TCNQ/MePyr.$^+$ rods | |
| XXV | 3/1 TCNQ/(Me$_3$N$^+$)$_2$ (CH$_2$)$_5$ S.C. | |
| XXVI | 2/1 TCNQ/Pr$_4$N$^+$ S.C. | $2 \times 10^5$. |
| XXVII | 1/1 TCNQ/Li powder | $8 \times 10^5$. |
| XXVIII | 2/1 TCNQ/Ba powder | 500–6$\times 10^5$. |
| XXIX | 3/2 TCNQ/Cs crystal | |
| XXX | 1/1 TCNQ/Bu$_4$N$^+$ powder | $8 \times 10^8$. |
| | 1/1 TCNQ/Et$_3$N$^+$ crystal | $7.5 \times 10^8$. |
| | 1/1 TCNQ/Et$_2$MeCNMeN$^+$ crystal | $3.3 \times 10^8$. |
| | 1/1 TCNQ/Et$_3$NNH$_2$ crystal | 10$^{10}$. |
| | 1/1 TCNQ/(Me$_2$N)$_3$S$^+$ crystal | 10$^5$. |
| | 1/1 TCNQ/(Me$_2$N)$_4$P$^+$ crystal | $4 \times 10^{10}$. |
| | 1/1 TCNQ/MePyr.$^+$ crystal | $2 \times 10^4$. |
| | 1/1 TCNQ/Me$\varphi_2$P$^+$ crystal | 10$^8$. |
| | 1/1 TCNQ/Me$_3$$^\circ$BuN$^+$ crystal | 10$^7$. |
| | 1/1 TCNQ/CNMePyr.$^+$ crystal | 10$^5$. |
| | 1/1 TCNQ/MeQuin.$^+$ crystal | $5 \times 10^6$. |
| | 1/1 TCNQ/CNMeQuin.$^+$ crystal | $3 \times 10^4$. |
| | 1/1 TCNQ/MeHOQuin.$^+$ crystal | $6.5 \times 10^4$. |
| XXXI | 1/1 TCNQ/Cs$^+$ powder | $8.5 \times 10^4$. |
| | 1/1 TCNQ/Ag$^+$ powder | $5.2 \times 10^4$. |
| | 2/1 TCNQ/Mn$^+$·3H$_2$O powder | $9.4 \times 10^4$. |
| | 2/1 TCNQ/FeII·3H$_2$O powder | $9 \times 10^4$. |
| | 2/1 TCNQ/CoII·3H$_2$O powder | 195. |
| | 2/1 TCNQ/NiII·3H$_2$O powder | 688. |
| | 2/1 TCNQ/CuI powder | $3.6 \times 10^4$. |
| | 2/1 TCNQ/CuI(NH$_3$)$_2$ powder | |
| | 2/1 TCNQ/CuII(ED)$_2$ powder | $1.5 \times 10^5$. |
| | 3/1 TCNQ/CeIII·6H$_2$O powder | $2.0 \times 10^4$. |
| | 2/1 TCNQ/PbII·1.5H$_2$O powder | $9.2 \times 10^5$. |
| | 3/1 TCNQ/SmIII·6H$_2$O powder | $1.9 \times 10^8$. |
| | 2/1 TCNQ/FeIIphen$_3$·6H$_2$O powder | $9.7 \times 10^7$. |
| | 2/1 TCNQ/NiIIphen$_2$·6H$_2$O powder | 40. |
| | 2/1 TCNQ/NiIIphen$_3$·6H$_2$O powder | $1.4 \times 10^9$. |
| | 2/1 TCNQ/CuII(pyr.)$_2$N$^+$ powder | |
| | 1/2 TCNQ/Cr$_2$OAc$_4$OH·6H$_2$O powder | |
| XXXII | 2/1 TCNQ/CNMePyr.$^+$ needles | 48. |
| | 2/1 TCNQ/MeQuin.$^+$ needles | 81. |
| | 2/1 TCNQ/CNMeQuin.$^+$ | 58. |
| | 1/1 TCNQ/NiPyr. Ald. Im | $1.5 \times 10^{11}$. |
| XXXIII | 2/1 TCNQ/BiPyridyl | 25. |
| | 2/1 TCNQ/BiQuinolyl | 44. |
| | 1/1 TCNQ/Me$_2$N$\varphi$N=NPyr | 10$^6$. |
| | 1/1 TCNQ/Me$_2$N$\varphi$N=N$\varphi$ | 10$^{11}$. |
| | 1/1 TCNQ/fluorenylamine | 10$^9$. |
| XXXIV | 2/1 TCNQ/Me$_2$N$\varphi$N=N—MePyr | 12.3. |
| XXXV | 1/1 TCNQ/Me$_2$N$\varphi$N=N—MePyr | $4.5 \times 10^5$. |
| | 1/1 TCNQ/C$_{18}$Me$_3$N$^+$ | |
| | 1/1 TCNQ/Cu(I) | 150. |
| | 1/1 TCNQ/N,N-Me$_2$Phenazinylium | $6.6 \times 10^4$. |
| | 4/1 TCNQ/(BiPyr)$_3$Fe(II) | 400. |
| XXXVI | 2/1 TCNQ/DAD$^+$ | 8.4. |
| XXXVII | 2/1 TCNQ(Me$_2$N$^+$)$_2$(MeS)$_3$Et | 363. |
| XXXVIII | 2/1 TCNQ/N-EtQuin.$^+$ | 8. |

3,162,641

TABLE B—Continued

| Example | Identity | Resistivity, Ohm-cm. |
|---|---|---|
| XXXIX | 2/1 TCNQ/Bu₄N | |
| XL | 1/1 TCNQ/N,N-D₂Morph.⁺ | 4.9×10⁹. |
| XLI | 2/1 TCNQ/DQuin.⁺ | |
| XLII | 2/1 TCNQ/N-propQuin | 0.5–450. |
| | 2/1 TCNQ/NφEtQuin | |
| | 2/1 TCNQ/Isoquin | 0.3. |
| | 2/1 TCNQ/phenanthrolinium | 0.9. |
| | 2/1 TCNQ/4HO quin | |
| | 2/1 TCNQ/Me₂phenazinyllum | 2.2. |
| XLIII | 1/1 TCNQ/phenazine | 10⁸. |
| XLIV | 1/1 TCNQ/phenazinyllum | 0.02. |
| XLV | 1/1 TCNQ/Me₂H₂phenazinium | 5.3×10⁴. |
| XLVI | 1/1 TCNQ/N-Mephenazinium | 0.007. |
| | 1/1 TCNQ/N-Etphenazinium | 4.2×10⁰. |
| | 1/1 TCNQ/N-Mephenanthrolinium | 8.3×10³. |
| | 1/1 TCNQ/N-Mequinoxalinium | 126. |
| | 1/1 TCNQ/N-Mepyrazinium | 3.4×10⁷. |
| | 1/1 TCNQ/N-Meacridinium | 4.7×10⁴. |
| | 2/1 TCNQ/(Phen)₃Fe(II) | 1×10⁹. |
| XLVII | 4/1 TCNQ/(Phen)₃Fe(II) | 24, 4.4×10², 4.5×10⁴. |
| XLVIII | 2/1 TCNQ/TMAE | 5×10⁸. |
| | 3/1 TCNQ/TMAE | 418. |
| XLIX | 1/1 TCNQ/φ₃pyrylium⁺ | 16. |
| | 2/1 TCNQ/φ₃pyrylium | |
| L | 2/1 TCNQ/N,N-Me₂diacridenium | |
| LI | 2/1 TCNQ/Et₃N⁺NH₃ | 49. |
| | 2/1 TCNQ/Et₃N⁺ | 0.5. |
| | 2/1 TCNQ/(Me₂N)₃S⁺ | 30. |
| | 2/1 TCNQ/(Me₂N)₄P⁺ | |
| | 2/1 TCNQ/N-Mephenazinium | 2.0. |
| | 2/1 TCNQ/N-Etphenazinium | 2.2. |
| LII | 2/1 TCNQ/N-Meacridinium | 5.3. |
| LIII | 2/1 MeTCNQ/Meφ₃As⁺ | 149. |
| | 2/1 MeTCNQ/Meφ₃P⁺ | 34.3. |
| | 2/1 MeTCNQ/Et₃N⁺ | 1.5×10⁴. |
| | 1/1 MeTCNQ/Na⁺ | 1.2×10⁶. |
| LIV | 1/1 MeTCNQ/Li | 3×10⁵. |
| LV | 1/1 n-PrTCNQ/Na | |
| LVI | 2/1 (TCNQ, MeTCNQ)/Meφ₃As⁺ | |
| | 2/1 (TCNQ, MeTCNQ)/Meφ₃P⁺ | |

The embodiments of the invention in which an exclusive property or privilege is claimed are defined as follows:

1. A compound of the formula $$(M^{+n})_x(TCNQ)_y^{-nx}$$

wherein TCNQ represents a member of the group consisting of 7,7,8,8-tetracyanoquinodimethan and C-alkyl-7,7,8,8-tetracyanoquinodimethan, each alkyl of said C-alkyl-7,7,8,8-tetracyanoquinodimethan containing 1–8 carbons, $n$ is the formal positive charge on cation M, $x$ is the number of cation species present, $-nx$ is the total negative charge on the TCNQ moieties, and $y$ is the total number of TCNQ moieties present.

2. A compound of claim 1 in single-crystal form.

3. A compound of the formula $$(M^{+n})_x[(TCNQ)^-]_{nx}$$

wherein TCNQ represents a C-alkyl-7,7,8,8-tetracyanoquinodimethan, each alkyl of said C-alkyl-7,7,8,8-tetracyanoquinodimethan containing 1–8 carbons, $M^{+n}$ is a cation of valence $n$, $x$ is the number of cation species present, $n$ is a number of 1 to 6, and the symbols (−) and (·) represent, respectively, a negative ionic charge and an electron.

4. A compound of the formula $$(M^{+n})_x[(TSNQ)^-]_{nx}$$

wherein TCNQ represents 7,7,8,8-tetracyanoquinodimethan, $M^{+n}$ is a cation of valence $n$, $x$ is the number of cation species present, $n$ is a number of 1–6 and the symbols (−) and (·) represent, respectively a negative ionic charge and an election.

5. A compound of the formula $$M^{+n}(TCNQ^-)_n(TCNQ^\circ)_m$$

wherein TCNQ represents a C-alkyl-7,7,8,8-tetracyanoquinodimethan, each alkyl of said C-alkyl-7,7,8,8-tetracyanoquinodimethan containing 1–8 carbons, $M^{+n}$ is a cation of valence $n$, and $m$ and $n$ are numbers of 1 to 6.

6. A compound of the formula $$M^{+n}(TCNQ)^-)_n(TCNQ^\circ)_m$$

wherein TCNQ represents 7,7,8,8-tetracyanoquinodimethan, $M^{+n}$ is a cation of valence $n$, $m$ and $n$ are numbers of 1–6, and the symbols (−), (·), and (∓) represent, respectively, a negative ionic charge, an electron and a netural species.

7. A compound of the formula $$M^{+n}[(TCNQ,RTCNQ)^-]_n$$

wherein TCNQ represents 7,7,8,8-tetracyanoquinodimethan and RTCNQ represents C-alkyl-7,7,8,8-tetracyanoquinodimethan, each alkyl of said C-alkyl-7,7,8,8-tetracyanoquindimethan containing 1–8 carbons, $M^{+n}$ is a cation of valence $n$, and $n$ is a number of 1 to 6.

8. A compound of the formula $$(M^{+n})_z(M^\circ)_w(TCNQ)_a^-(TCNQ)_b^d$$

wherein TCNQ represents 7,7,8,8-tetracyanoquinodimethan, $n$ is the formal charge on cation M, $w$ and $z$ are numbers, the sum of which equals the total number of cation species present, $a$ and $b$ are also numbers the sum of which represents the total number of dimethan moieties present and $nz$ equals $a$ and the symbols (−), (·), and (°) represent, respectively a negative ionic charge, an electron and a combined neutral species.

9. A compond of the formula $$(M^{+n})_z(M^\circ)_w(RTCNQ)_a^-(RTCNQ)_b^d$$

wherein RTCNQ represents a C-alkyl-7,7,8,8-tetracyanoquinodimethan, each alkyl of said C-alkyl-7,7,8,8-tetracyanoquinodimethan containing 1 to 8 carbons, $n$ is the formal charge on cation M, $w$ and $z$ are numbers, the sum of which equals the total number of cation species present, $a$ and $b$ are also numbers the sum of which represents total number of dimethan moieties present and $nz$ equals $a$ and the symbols (−), (·), and (°) represent, respectively, a negative ionic charge, an electron, and a combined neutral species.

10. A compound of the formula $$(M^{+n})_x(TCNQ_a^{-nx}(TCNQ)_b^\circ$$

wherein TCNQ represents 7,7,8,8-tetracyanoquinodimethan, $n$ is the formal positive charge on cation M, $x$ is the number of cation species present, $-nx$ is the total negative charge on the TCNQ moieties, $a$ and $b$ are numbers the sum of which equals the total number of TCNQ moieties present, and $(TCNQ)_b^\circ$ represents a combined neutral TCNQ species.

11. A compound of the formula $$M^{+n}[(TCNQ_a RTCNQ_b)^-]_x$$

wherein RTCNQ represents a C-alkyl-7,7,8,8-tetracyanoquinodimethan, each alkyl of said C-alkyl-7,7,8,8-tetracyanoquinodimethan containing 1 to 8 carbon atoms, $n$ is the formal positive charge on cation M, $x$ is the number of cation species present, $-nx$ is the total negative charge on the RTCNQ moieties, $a$ and $b$ are numbers the sum of which equals the total number of RTCNQ moieties present, and $(RTCNQ)_b{}^\circ$ represents a combined neutral RTCNQ species.

12. The compound of claim 4 wherein M is lithium, $n$ is 1 and TCNQ is 7,7,8,8-tetracyanoquinodimethan.

13. Potassium tetracyanoquinodimethanide.

14. The compound of claim 6 wherein TCNQ is 7,7,8,8-tetracyanoquinodimethan, M is quinolinium, $n$ is 1 and $m$ is 1.

15. Process for preparing a compound of claim 1 which comprises interacting a cation and TCNQ in an inert solvent, said TCNQ being selected from the class consisting of 7,7,8,8-tetracyanoquinodimethan and C-alkyl-7,7,8,8-tetracyanoquinodimethan, each alkyl of said C-alkyl-7,7,8,8-tetracyanoquinodimethan containing 1–8 carbons.

No references cited.

UNITED STATES PATENT OFFICE
CERTIFICATE OF CORRECTION

Patent No. 3,162,641  December 22, 1964

Donald S. Acker et al.

It is hereby certified that error appears in the above numbered patent requiring correction and that the said Letters Patent should read as corrected below.

Column 1, lines 24 and 25, for "Serial No. 75,009, filed December 12, 1960, now Patent No. 3,062,019" read -- Serial No. 75,099, filed December 12, 1960, now abandoned --; column 51, line 63, for "election" read -- electron --; column 52, line 31, for "and (⁻)" read -- and (⁰) --; line 33, for for "netural" read -- neutral --; same column 52, line 40, for "tetracyanoquindimethan" read -- tetracyanoquinodimethan --; column 53, line 2, the formula should appear as shown below instead of as in the patent:

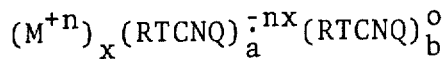

$$(M^{+n})_x (RTCNQ)_a^{-nx} (RTCNQ)_b^0$$

Signed and sealed this 22nd day of June 1965.

(SEAL)
Attest:

ERNEST W. SWIDER
Attesting Officer

EDWARD J. BRENNER
Commissioner of Patents